(12) United States Patent
Sager

(10) Patent No.: US 11,970,860 B2
(45) Date of Patent: Apr. 30, 2024

(54) FILTRATION DEVICE WITH ION DISPERSING MATERIAL

(71) Applicant: Karen M. Sager, Ridgewood, NJ (US)

(72) Inventor: Karen M. Sager, Ridgewood, NJ (US)

( * ) Notice: Subject to any disclaimer, the term of this patent is extended or adjusted under 35 U.S.C. 154(b) by 565 days.

(21) Appl. No.: 16/802,895

(22) Filed: Feb. 27, 2020

(65) Prior Publication Data

US 2021/0270040 A1 Sep. 2, 2021

(51) Int. Cl.
| | |
|---|---|
| *E04D 13/076* | (2006.01) |
| *C02F 1/00* | (2023.01) |
| *C02F 1/50* | (2023.01) |
| *C02F 103/00* | (2006.01) |

(52) U.S. Cl.
CPC ............ *E04D 13/076* (2013.01); *C02F 1/004* (2013.01); *C02F 1/505* (2013.01); *C02F 2103/001* (2013.01); *C02F 2303/04* (2013.01)

(58) Field of Classification Search
CPC ... E04D 13/076; E04D 13/064; E04D 13/002; E04D 13/0404; E04D 13/0481; E04D 13/0725; E04D 13/0762; E04D 13/08; E04D 13/103; E04D 13/158; C02F 1/004; C02F 1/505; C02F 2103/001; C02F 2303/04; C02F 1/001; C02F 1/44; C02F 2303/20; C02F 2307/08
See application file for complete search history.

(56) References Cited

U.S. PATENT DOCUMENTS

| | | | |
|---|---|---|---|
| 3,057,481 | A | 10/1962 | Pall |
| 3,428,183 | A | 2/1969 | Bristow |
| 4,841,686 | A | 6/1989 | Rees |
| 4,907,381 | A | 3/1990 | Ealer |
| 5,592,783 | A | 1/1997 | Jones |
| 5,619,825 | A | 4/1997 | Leroney et al. |
| 6,598,352 | B2 | 7/2003 | Higginbotham |
| 6,951,077 | B1 * | 10/2005 | Higginbotham ...... E04D 13/076 52/12 |
| 7,174,688 | B2 | 2/2007 | Higginbotham |
| 7,191,564 | B2 | 3/2007 | Higginbotham |
| 7,913,458 | B2 | 3/2011 | Higginbotham |
| 8,006,438 | B2 | 8/2011 | Tigginbotham |
| RE42,896 | E | 11/2011 | Higginbotham |
| RE43,555 | E | 7/2012 | Higginbotham |
| 8,312,677 | B2 | 11/2012 | Higginbotham |
| 8,397,436 | B2 | 3/2013 | Higginbotham |
| 8,595,985 | B1 | 12/2013 | Feldhaus |
| 9,010,029 | B2 | 4/2015 | Higginbotham |
| 9,127,463 | B1 | 9/2015 | Feldhaus |
| 2003/0046876 | A1 | 3/2003 | Higginbotham |
| 2004/0031222 | A1 | 2/2004 | Porat |

(Continued)

*Primary Examiner* — Patrick Orme
(74) *Attorney, Agent, or Firm* — MH2 TECHNOLOGY LAW GROUP LLP; Stuart I. Smith

(57) ABSTRACT

A filtration device for filtering a fluid includes a first barrier member having a plurality of openings through which the fluid can penetrate the first barrier member, the first barrier member having a plurality of edges including a first edge; and a first ion-dispersing thread in the first barrier member. A portion of the first ion-dispersing thread extends in a direction, the direction is non-parallel to the first edge of the first barrier member, and the direction is non-perpendicular to the first edge of the first barrier member.

24 Claims, 20 Drawing Sheets

(56) References Cited

U.S. PATENT DOCUMENTS

| | | | |
|---|---|---|---|
| 2004/0214495 A1* | 10/2004 | Foss | A01N 57/16 |
| | | | 442/199 |
| 2005/0102909 A1* | 5/2005 | Carpenter | E04D 13/076 |
| | | | 52/11 |
| 2006/0248805 A1 | 11/2006 | Gentry | |
| 2007/0045176 A1* | 3/2007 | Chandra | C02F 1/004 |
| | | | 210/501 |
| 2007/0055007 A1 | 3/2007 | Pagel et al. | |
| 2007/0068092 A1 | 3/2007 | Fraser, Jr. | |
| 2009/0000210 A1 | 1/2009 | Barnett | |
| 2009/0288349 A1 | 11/2009 | Wootton | |
| 2010/0251626 A1 | 10/2010 | Roque Alonso | |
| 2011/0252723 A1 | 10/2011 | Devery | |
| 2011/0308557 A1 | 12/2011 | Kaiser | |
| 2012/0144759 A1* | 6/2012 | Higginbotham | E04D 13/076 |
| | | | 52/12 |
| 2013/0097943 A1* | 4/2013 | Higginbotham | E04D 13/064 |
| | | | 52/12 |
| 2013/0160377 A1* | 6/2013 | Sager | E04D 13/076 |
| | | | 52/12 |
| 2014/0338284 A1* | 11/2014 | Spencer | E04D 7/005 |
| | | | 428/596 |
| 2015/0143756 A1* | 5/2015 | Higginbotham | E04D 13/076 |
| | | | 52/12 |
| 2019/0063070 A1* | 2/2019 | Cullen | E04D 13/076 |
| 2019/0352912 A1* | 11/2019 | Sager | E04D 13/0481 |

\* cited by examiner

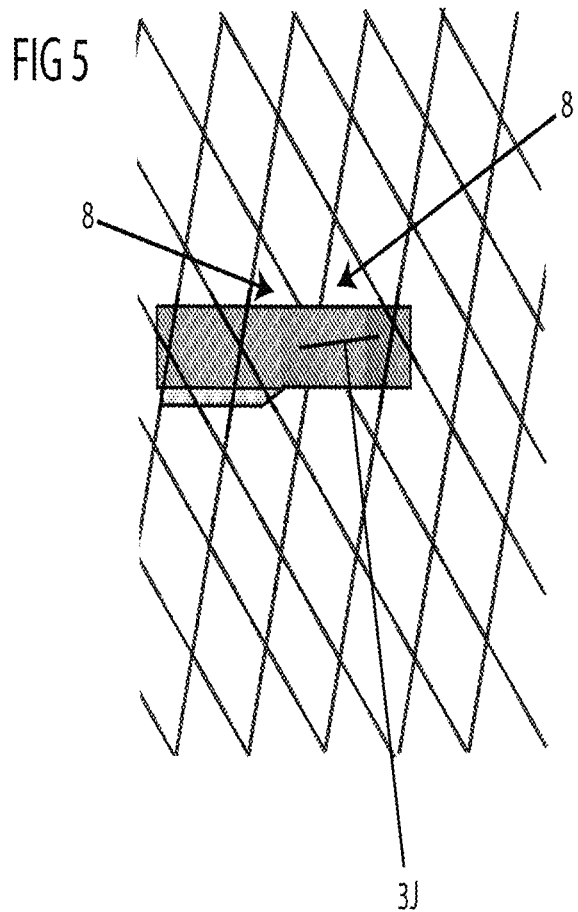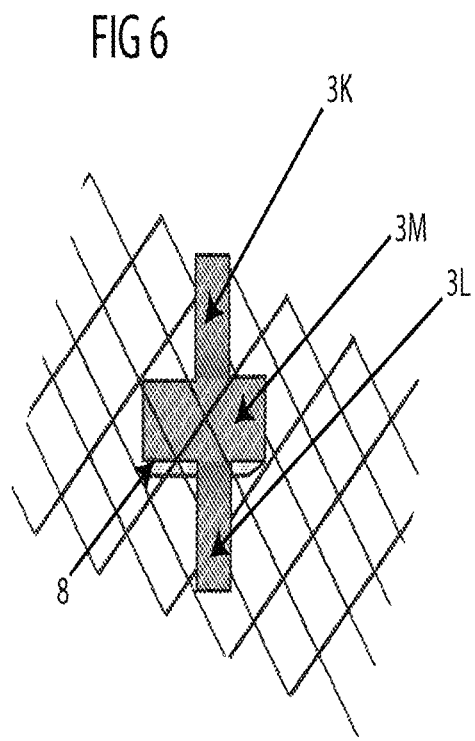

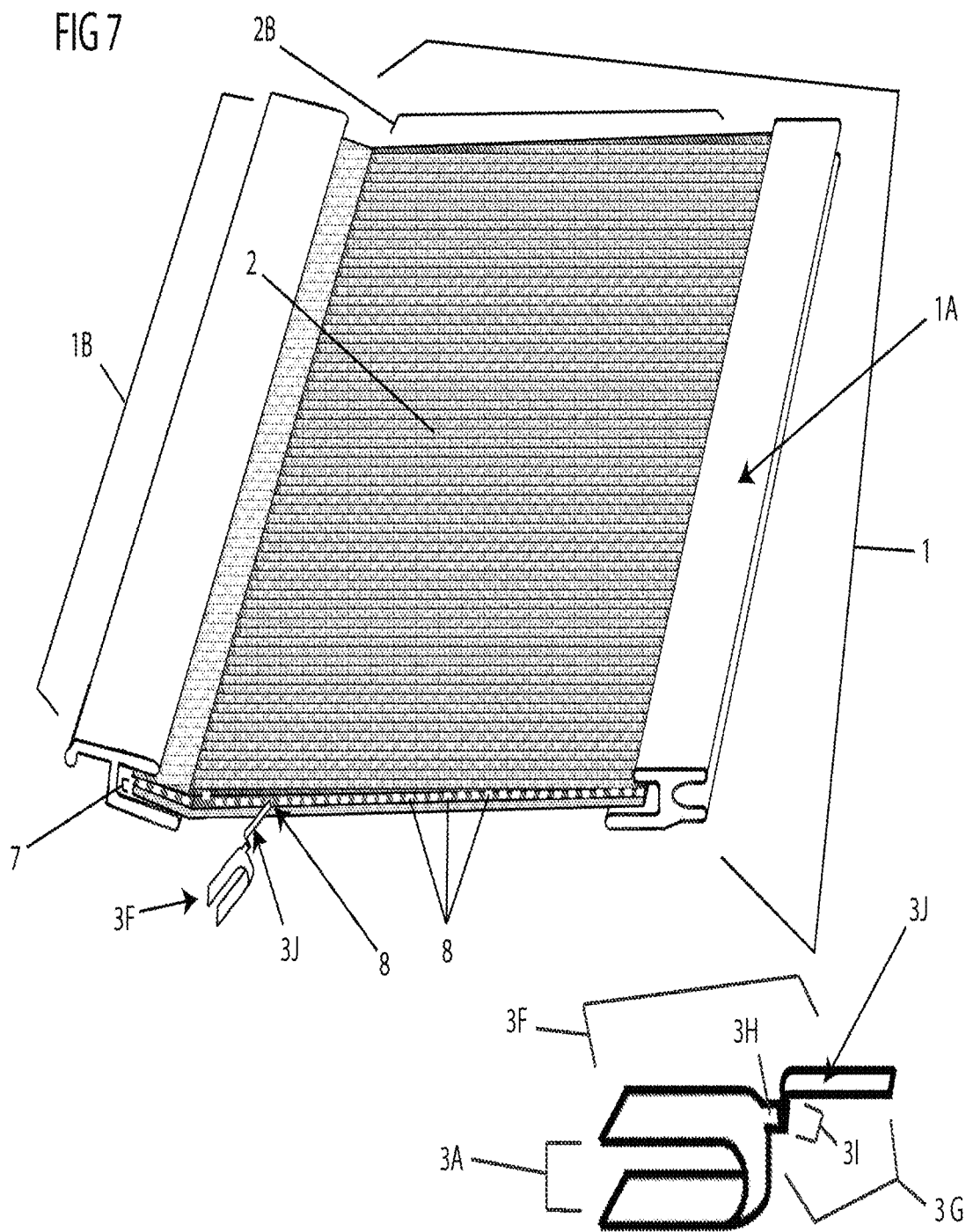

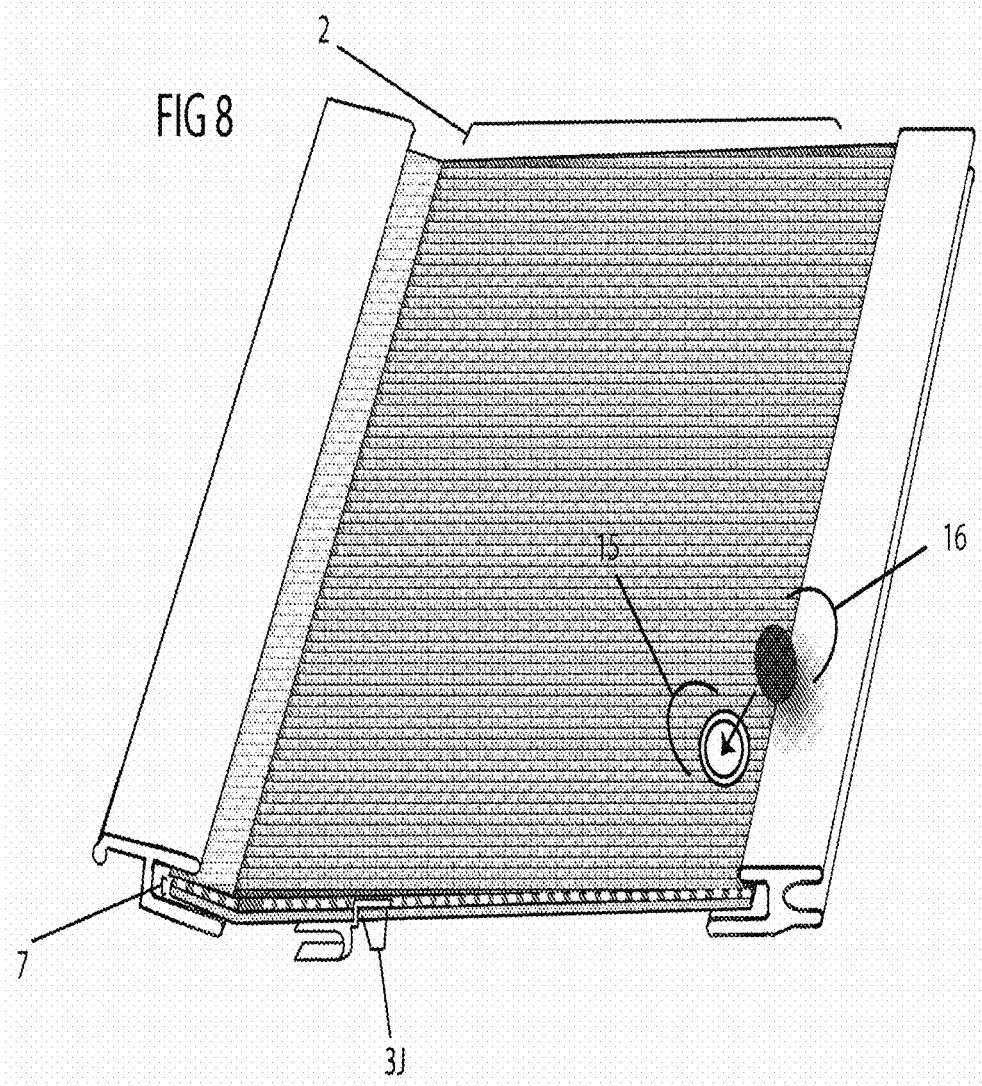

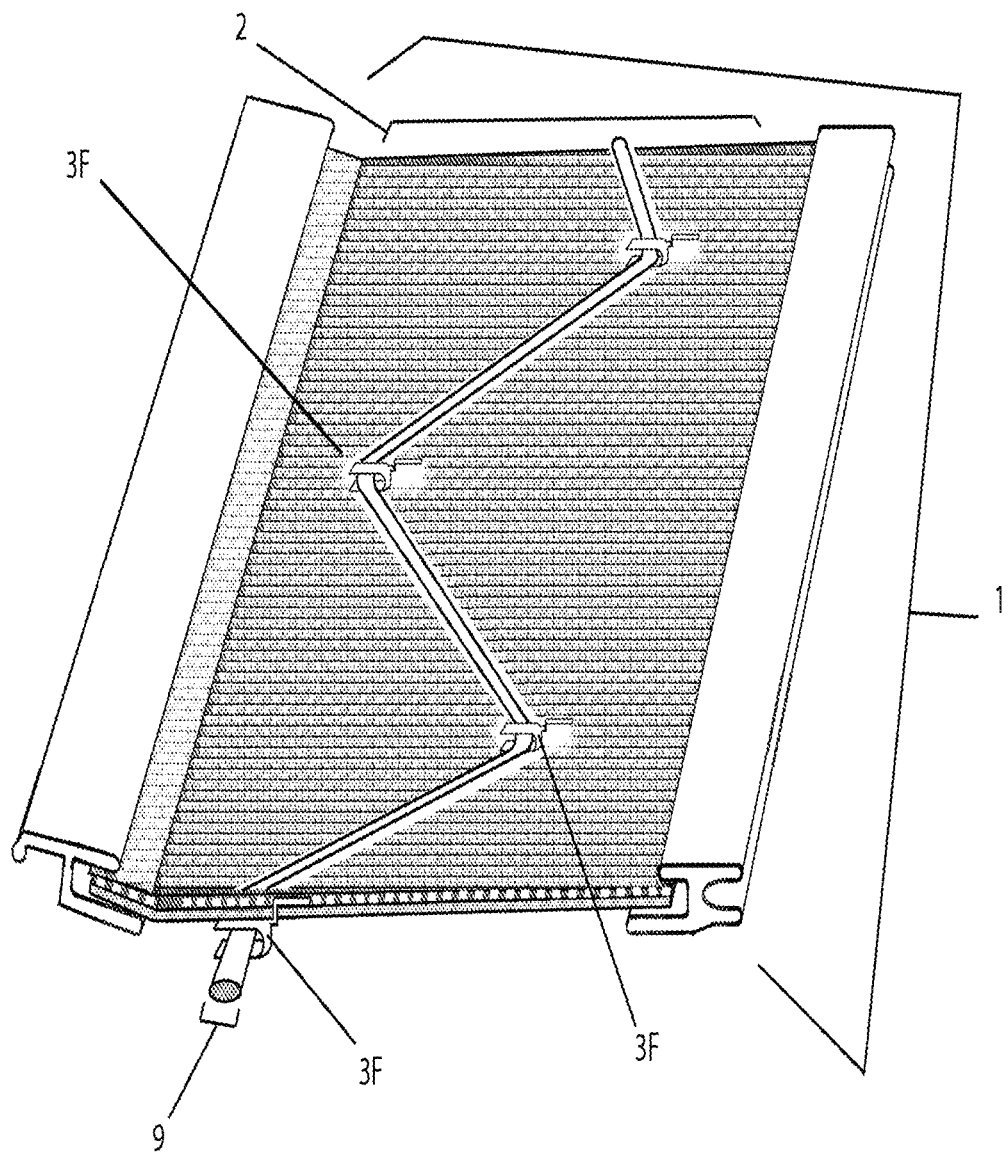

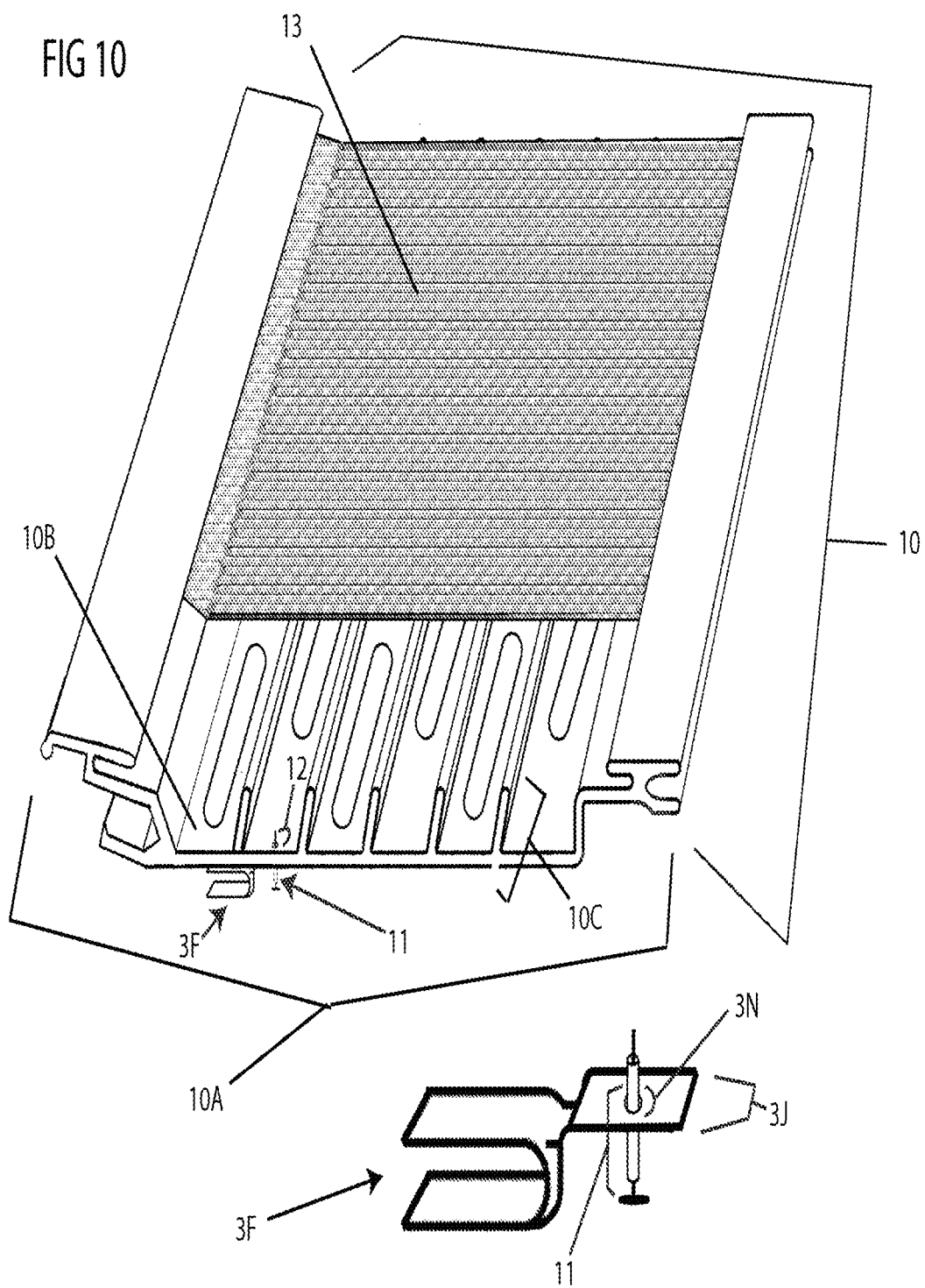

FILTRATION DEVICE WITH ION DISPERSING MATERIAL

FIELD OF THE INVENTION

Embodiments of the invention are directed to systems and methods that disperse ions to prevent or reduce the growth of moss, mold, mildew, and other organic or biological materials on a filtration device.

An example of an application for the invention is a gutter guard that prevents or reduces debris from entering a rain gutter on a building.

Embodiments of the invention relate to gutter guard systems which are adapted to be placed on rain gutters such as those provided on the eaves of a house or other structure to collect and direct water away from a building while preventing debris from collecting in the gutter. More particularly, embodiments of the invention relate to methods of fitting any gutter guard system or method with clips so that they may optionally include a heat source to melt ice, snow or other frozen water that has formed so that the system can function when frozen water is encountered adjacent to the system. Embodiments of the invention relate to methods of incorporating copper or other moss killing elements in a ratio of element to screen or water receiving area that ensures or promotes the killing of moss, mold, or other organic materials but that does not cause clogging of the water receiving area due to an overabundance of corrosive or oxidized elements leaching from the moss killing material. Embodiments of the invention also provide drawing cables or other elements through a top surface of gutter guards and/or of ion dispersing elements down through and into an underlying gutter.

BACKGROUND OF THE INVENTION

There exists a problem of debris collecting within gutters. Many different forms of gutter guard systems have been developed to prevent debris from collecting in a gutter. Some such gutter guards are of a type that provides merely a solid plane with holes therein so that water can pass through, but certain debris cannot. Such simple systems suffer from the serious drawback that the holes must be large enough that water will pass through, rather than adhering due to surface tension and adhesion forces to edges of the holes as noted by Higginbotham in U.S. Pat. No. 6,598,352. On the other hand, the holes must be small enough to prevent certain debris from passing through. Experience has shown that the compromises required with such simple gutter guard systems lead to serious deficiencies in the performance of such gutter guard systems, either not effectively allowing water to pass through or too often allowing debris to pass through or lodge within the holes.

Other gutter guard systems utilize solid planes of material with a sharp curve in the surface which water can adhere to, but which certain debris will not adhere to. Water adheres to the sharply curving metal portion and is routed in a curving path into the gutter, while certain debris falls off of such a gutter guard. Such gutter guards have advantages and disadvantages such as, for example, oil from shingles eventually coats and waterproofs such systems requiring that the be manually and periodically cleaned.

Another form of gutter guard utilizes a fine mesh filter element which has sufficiently small holes therein that certain debris cannot pass through. This fine mesh filter element, which is formed as a thin flexible screen material, is supported upon a rigid underlying support structure that holds the filter element in place. The underlying support structure having holes therein to route water passing through the filter element down through the support structure and into the gutter. Such two-part filter and support structure gutter guards allow substantially all debris to be prevented from entering the gutter while allowing high volumes of water to be directed into the gutter.

A common problem experienced by all different types of gutter guard systems in certain environments is that when freezing temperatures are encountered, water on and adjacent to the gutter guard will freeze, and prevent water from passing into the gutter. When such gutter guard performance is inhibited, freeze and thaw cycles can result in large icicles forming off of edges of the gutters or other portions of the roof. Freeze-thaw cycles that occur may result in ice dam formation. Additionally, the weight of the snow and ice on the gutter guard can potentially damage the gutter or gutter guard.

One solution for de-icing gutters and gutter guards is the use of heat cables. In at least one case, a gutter guard of the curving metal cover type has had such a heat cable affixed into the gutter guard so that the surface of the gutter guard could conduct heat from the resistance heating wire to melt frozen water off of the gutter.

A drawback of some types of heating systems is that much of the water receiving area is lost due to utilization of a solid cover over the heating element. Another drawback of some of these methods is the high cost of manufacture and of installation of the product. Yet another drawback of some of these systems is that the solid cover lessens the intensity of heat that could be delivered to the underside of ice overlying the cover versus heat radiating from a heating cable through a screen or mesh. Yet another drawback of some of these systems is that the heating cable's placement and heat disbursement is limited to a narrowly defined covered channel. Yet another drawback of some of these systems is that, in areas where icing is not a problem, the system offers greater cost with less water receiving and redirecting performance. Yet another drawback of some of these systems is that the heating cable is not easily installed or, if need be for repair, removed in that they require affixing the solid channel cover and entire gutter guard system, by screws, to the front top lip of a rain gutter.

Accordingly, embodiments of the invention address a need that exists for a gutter guard system that is easily and readily installed, that may be installed as a retrofit to existing gutter guards, that is inexpensive, that does not interfere with a micro-mesh product's ability to receive and redirect water, and that allows for the placement of a heating cable in more than one location.

Applicant recognized an improvement to the above arrangements and implements that improvement in embodiments of the invention.

SUMMARY

Embodiments of the invention encompasses clips, that may be solid or water permeable, and that are affixed to the underside of water-receiving areas of gutter guards, with their open ends facing any direction, serving as fixed points whereby heating cables or other elements may be channeled to and routed through. The clips may be of any shape and comprised of any amount of components, levels, or extending and/or securing features most readily allowing attachment to a particular type of gutter guard: flat perforated planes or meshes or expanded metal, or curved planes, or multi-level perforated body and overlying screen systems, systems that employ downward extending inseams or channels as water directing areas, and other systems. In embodiments, the clips are fastened or stapled through or affixed to the top of gutter guards and they, or their fasteners, are comprised of copper or other mold and moss killing materials.

Embodiments of the invention also encompass the employment of a copper or other material thread or plurality of threads interwoven into, or embroidered onto, or otherwise attached or adjacent to, cloth or sponge or mesh gutter guard areas of a gutter guard for the purpose of dispersing ions during, for example, periods of rain to prevent the growth of moss, mold, mildew, or other organic or biological material on the gutter guard.

Embodiments of the invention also encompass the utilization of holes or grommets, which can themselves be made of copper or other ion dispersing material, in the top plane of gutter guards through which to pull heating or other cables.

An object of embodiments of the invention is to provide readily adaptable and readily installed pathways by means of securing clips to the underside of gutter guards either during their manufacture, during installation in the field, or as a retrofit process of attaching the inexpensive clips to any existing gutter guard.

Another object of embodiments of the invention is to allow gutter guard systems to melt frozen water thereon.

Another object of embodiments of the invention is to provide a gutter guard including a filter element and an underlying support structure of clips which secure a heating cable to conduct heat from a heat source through the underlying support structure to the filter element so that the filter element melts frozen water thereon, such system being inexpensive to manufacture and readily installed by simply lifting the front of the gutter guard and pushing a heating cable into place.

Another object of embodiments of the invention is to provide a system for keeping gutters operating in freezing conditions and to prevent icicle formation or damage to the gutter from the weight of frozen water loads and to reduce ice dam buildup. Another object of embodiments of the invention is to provide a method for de-icing a gutter that also prevents debris from entering the gutter. Another object of embodiments of the invention is to provide easy access for the replacement or repair of heating cables utilized by a gutter guard. Another object of embodiments of the invention is to allow a gutter guard to offer a heating capability without limiting its ability to receive and redirect water. Another object of embodiments of the invention is to use the melted snow or ice and to harvest it for water collection during the time of year when rainwater harvesting would not be practical.

Another object of embodiments of the invention is to provide a method, by means of clips or thread(s) comprised of copper, or other material, that disperses copper ions or other material elements that serve to prohibit the growth of moss, mold, mildew, or other organic or biological materials on a gutter guard. Another object of embodiments of the invention is to provide a method of killing the moss, mold, mildew, or other organic or biological, spores in an initial filtration step at the gutter when a gutter guard is part of a rainwater harvesting system.

Another object of embodiments of the invention is to provide an access hole or grommet in a top area of a gutter guard through which to draw cables or through which to insert or disperse elements into an underlying gutter.

Other further objects of embodiments of the invention will become apparent from a careful reading of the included drawing figures, the claims and detailed description of the invention.

Particular embodiments of the invention are directed to a filtration device for filtering a fluid. The filtering device includes a first barrier member having a plurality of openings through which the fluid can penetrate the first barrier member, the first barrier member having a plurality of edges including a first edge; and a first ion-dispersing thread in the first barrier member. A portion of the first ion-dispersing thread extends in a direction, the direction is non-parallel to the first edge of the first barrier member, and the direction is non-perpendicular to the first edge of the first barrier member.

Some embodiments include a second barrier member having a plurality of openings through which the fluid can penetrate the second barrier member, the second barrier member having a plurality of edges including a first edge. The first barrier member and the second barrier member are in an overlay relationship relative to each other such that the fluid penetrating one of the plurality of openings in the first barrier member penetrates one of the plurality of openings in the second barrier member.

Other embodiments of the invention are directed to a filtration device for filtering a fluid. The filtration device includes a first barrier member having a plurality of openings through which the fluid can penetrate the first barrier member, the first barrier member having a plurality of edges including a first edge; a second barrier member having a plurality of openings through which the fluid can penetrate the second barrier member, the second barrier member having a plurality of edges including a first edge; and an ion-dispersing thread in the first barrier member. The first barrier member and the second barrier member are in an overlay relationship relative to each other such that the fluid penetrating one of the plurality of openings in the first barrier member penetrates one of the plurality of openings in the second barrier member, the first barrier member is at least one selected from the group consisting of: a filtering screen, a porous membrane, a porous film, a fluid permeable mat, and an air permeable mat, and the second barrier member is at least one selected from the group consisting of: a filtering screen, a porous membrane, a porous film, a fluid permeable mat, and an air permeable mat. In some embodiments, the first barrier member and the second barrier member are different ones of the group consisting of: a filtering screen, a porous membrane, a porous film, a liquid permeable mat, and an air permeable mat.

Other embodiments of the invention are directed to a filtration device for filtering a fluid. The filtration device includes a barrier member having a plurality of openings through which the fluid can penetrate the barrier member, the barrier member having first members that extend along a first direction, and second members that extend along a second direction that is non-parallel to the first direction; and an ion-dispersing thread in the barrier member. The first members are made of a first material, the second members are made of a second material, the first material and the second material are different materials, the barrier member is a single-layer mesh, and the single-layer mesh comprises the first members and the second members.

BRIEF DESCRIPTION OF THE DRAWINGS

The following figures form part of the present specification and are included to further demonstrate certain aspects of the disclosed features and functions, and should not be used to limit or define the disclosed features and functions. Consequently, a more complete understanding of the exemplary embodiments and further features and advantages thereof may be acquired by referring to the following description taken in conjunction with the accompanying drawings, wherein:

FIG. 5 is a view of a clip whose rear tab is inserted through and installed within the openings of an expanded metal section of a gutter guard;

FIG. 6 is a view of a clip whose side tabs are inserted through and installed within the openings of an expanded metal section of a gutter guard;

FIG. 7 is a view of a gutter guard comprising a fine mesh screen overlying an expanded metal support skeletal structure illustrating a clip being inserted into expanded metal openings and a view of a clip with a multi-level rear tab that extends rearward from the upper plane of the clip;

FIG. 8 is a view of a gutter guard comprising a fine mesh screen overlying an expanded metal support skeletal structure illustrating a clip fully inserted into expanded metal openings and illustrating a grommet with cover present in the top plane of a screened gutter guard;

FIG. 9 is a view of a gutter guard comprising a fine mesh screen overlying an expanded metal support skeletal structure illustrating the rear tab of clips inserted in zig-zag pattern into and through expanded metal openings existent on the lower expanded metal plane of the gutter guard;

FIG. 10 is a view of a solid body gutter guard with overlying screen mesh such gutter guard body having clips pop-riveted to the underside of its lowermost plane;

DETAILED DESCRIPTION

The invention is described herein with reference to the accompanying drawings in which exemplary embodiments of the invention are shown. The invention may, however, be embodied in many different forms and should not be construed as limited to the embodiments set forth herein.

When, in this disclosure, threads or wires are represented by segmented lines, the segments that are present in a line path represent both individual threads or wires, as well as portions of a single wire or thread, that are present above or below or both above and below a screen's or porous film's or membrane's or mat's upper or lower surface. In instances where a segmented line is described as a singular wire or thread, such description does not exclude the segmented line as alternately being an assembly of smaller threads or wires, each wire or thread having an initial end and a terminal end, with each wire or thread being represented by a segment present in the line's path.

In this disclosure, the terms copper or zinc wire or thread, copper wire, copper thread, zinc wire, zinc thread, ion-dispersing wire, and ion-dispersing thread are understood to include any wire or thread comprised of, or coated with, copper or zinc or comprised of, or coated with, any other material that is known to inhibit or eliminate the growth of moss and/or mold and/or mildew and/or fungus and/or other organic or biological materials.

In this disclosure, the term filtering screen is understood to include any network of threads or wires adjacent to or connected to one another that serve to allow for the passage of air or a liquid (for example, water) while inhibiting or preventing the passage of solid matter.

In this disclosure, the term present in a/the barrier member, screen, membrane, film, or mat is understood to include any method by which a thread or wire may be incorporated into, or affixed to the top or bottom surface of, a barrier member, screen, membrane, film, or mat, including but not limited to the thread or wire being sewn or woven into, sewn onto, adhered to, sintered onto, and pressed into or onto the barrier member, screen, membrane, film, or mat.

As mentioned above, embodiments of the invention provide systems and methods that disburse ions to prevent or reduce the growth of moss, mold, mildew, and/or any other organic or biological materials on a filtration device.

Figure 1:
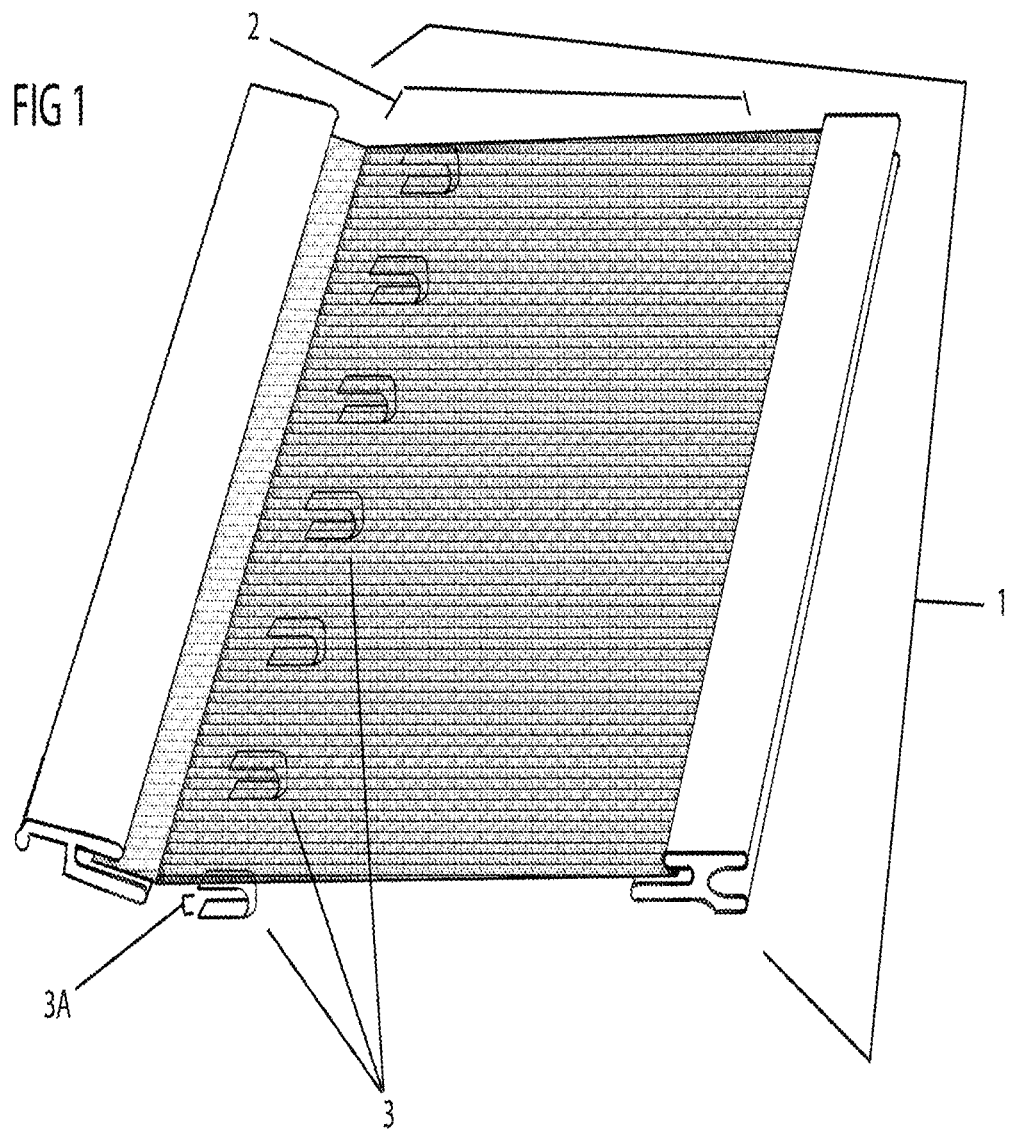
FIG. 1 is a top view of a screened gutter guard with heat cable receiving clips installed on the underside of the screen.

Referring to FIG. 1, there is illustrated a gutter guard 1 with a screened main body and water receiving area 2. Also illustrated are clips 3 secured beneath the screened body 2 by adhesion, pop rivet, tab, or any common fastening method. The open end of clips 3A face forward and serve to receive and secure a heating cable or other element.

Figure 2:
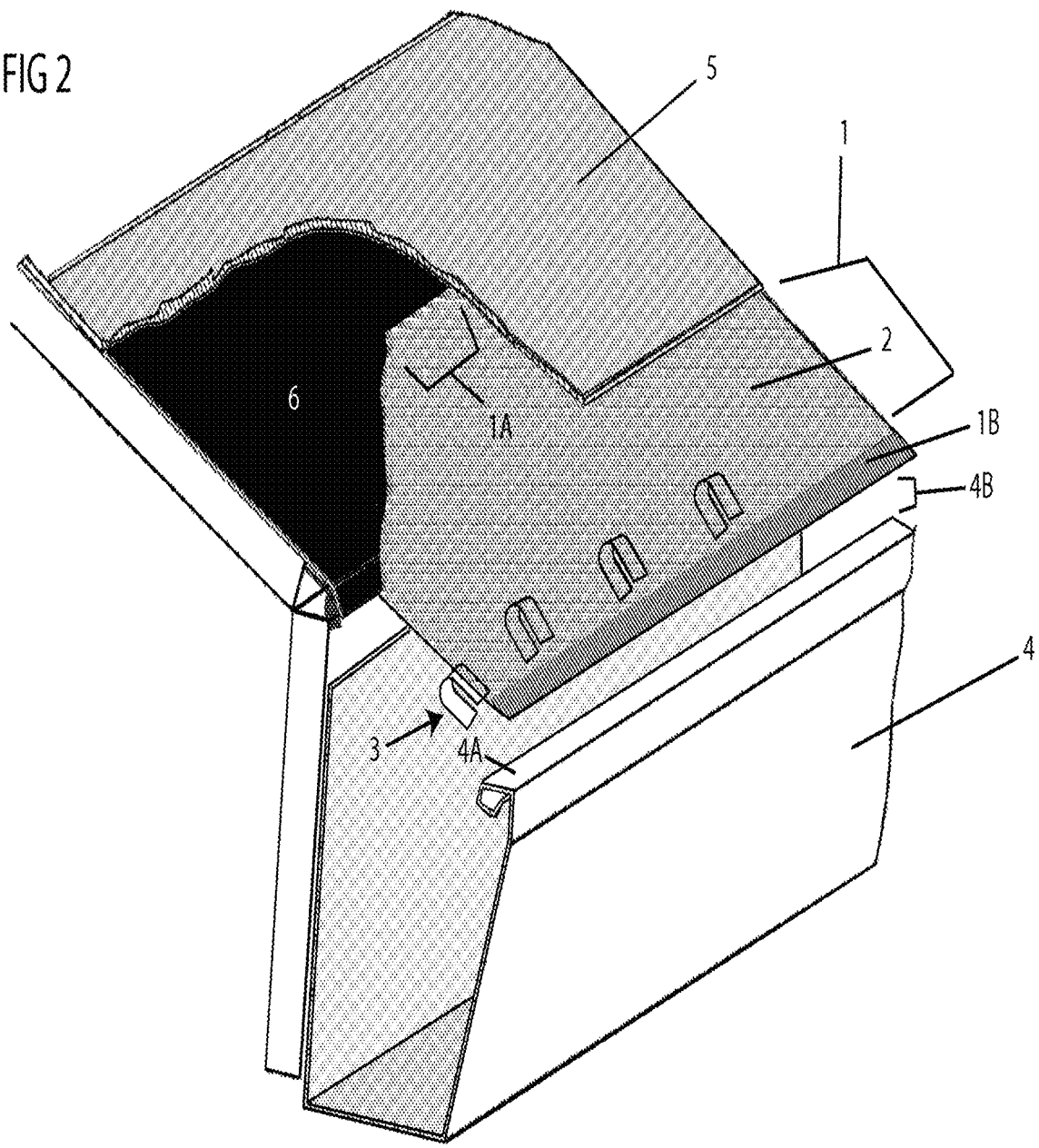
FIG. 2 is a view of a screened gutter guard, with heat cable receiving clips installed on the underside of the screen, installed in a rain gutter.

Referring to FIG. 2, there is illustrated a gutter guard 1 whose rear lateral edge 1A is inserted and sandwiched between a roof underlayment 6 and roof covering 5. As illustrated, the gutter guard 1 has clips 3 attached to its underside. The placement of the clips 3 immediately beneath the surface 2 of the gutter guard and near the gutter guard's front lateral edge 18 and facing forward allows for easy installation of a heating cable or other element during installation of the gutter guard in that the gutter guard only need be lifted slightly up from the gutter creating just enough open air space 48 to allow for the insertion of a heating cable into the clips 3. Once the cable is inserted, the gutter guard 1 may be pulled forward and downward and secured to the front top lip 4A of the gutter 4.

Figure 3:
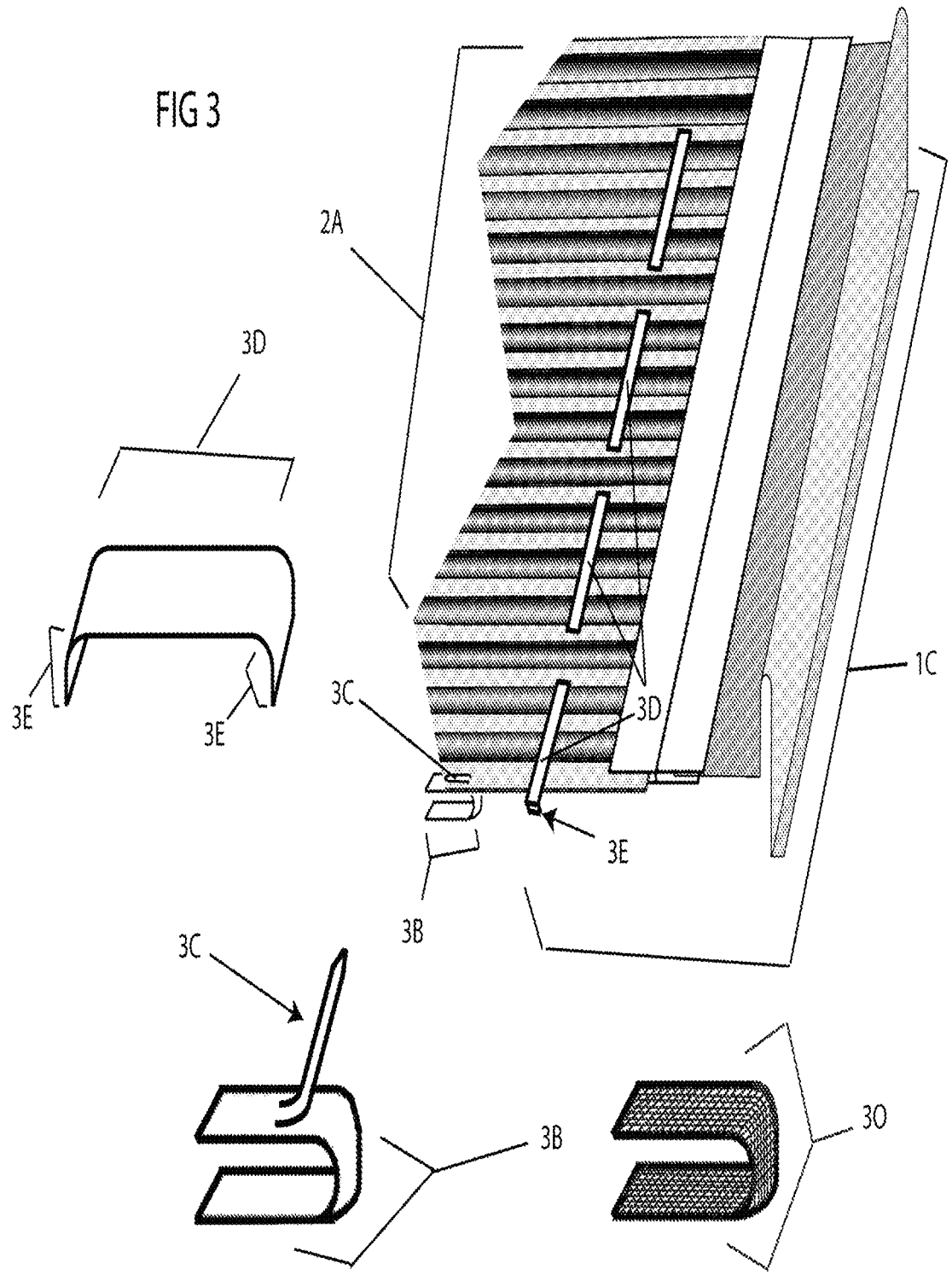
FIG. 3 is a view of the rear section of a corrugated screened gutter guard with a heat receiving clip installed on the underside of the corrugated and views of three types of clips.

Referring to FIG. 3, there is illustrated a cut-a-way rear section 1C of a gutter guard with a fastening clip 38 and a fastening clip 30 attached to the gutter guard's corrugated screened main body and water receiving area 2A. A piercing tab 3C extends upward from the clip enabling the clip to pierce the corrugated screen of the gutter guard. The tab 3C is then pressed downward securing the clip 38 to the under surface of the corrugated screened body 2A of the gutter guard 1C. It is understood that this is an illustration of a simple and single method representative of multiple methods (not shown) that may be utilized for securing a clip to the underside of a gutter guard's body. Other methods include adhesives, weld joints, etc.

Referring to FIGS. 5 and 6, another method of securing clips by way of perforations or openings present in a gutter guard is illustrated. Referring specifically to FIG. 7, a gutter guard 1 is illustrated comprising a front lateral edge 18, an intermediate body portion 28, said intermediate body portion being comprised of screen 2 over expanded metal 7, and a rear lateral edge 1A. The clip 3F exhibits a rear tab 3G comprised of a lower plane 3H extending from the main body of the clip, an intermediate and upward extending connecting plane 31, and a rear ward extending an upper plane 3J. Plane 3J may be inserted up and through expanded metal openings 8, the clip then pushed rearward until, referring now to FIGS. 5 and 8, plane 3J rests on top of the expanded metal 7 and beneath an overlying filtering screen 2. Referring specifically to FIG. 5, it is shown that plane 3J may insert up and through an opening or perforation, rest on top of the plane, and then distend downward through an adjacent opening. Referring specifically to FIG. 6, it is shown that planes 3K and 3L may extend sideways from an upper plane 3M of a clip and similarly secure the clip by lodging within the openings 8.

Referring again to FIG. 3, a clip 30 is illustrated comprised of screen mesh or other water permeable material. Such porous material may be desirable to prevent the forward tracking of water along the top surface of a clip by allowing for water to travel down and through the porous surface into an underlying rain gutter.

Referring to FIG. 9, it is illustrated that the clips 3F may be positioned in a staggered fashion allowing a heating cable 9 to provide patterns of heat radiation on the underplane or underside of a gutter guard 1 rather than distributing the heat in a single linear plane as would occur in FIG. 1.

Referring to FIG. 10, there is illustrated a gutter guard 10 with a solid, extruded or roll formed, body 10A that comprises a perforated plane 10B from which rises upward extending planes 10C which are overlain by a screen of filtering membrane 13.

Referring to FIG. 3, there is illustrated a copper, or zinc, or other material clip 30 or staple that may be stapled or inserted through a top member or plane or corrugated screen 2A and serve as a copper-ion or other material dispersing medium to aid in the prevention or elimination of moss or mold or mildew buildup on the water receiving areas of a gutter guard 2A. Embodiments include stapling copper or zinc or other material clips or staples into the body. Stapling copper into the body of many thin-bodied or screened gutter guards is easily accomplished during manufacture or as retrofit on already installed gutter guard products.

When combining copper with other metals a ratio must be kept in mind to prevent over corroding and clogging of the remainder of the gutter guard, especially its water receiving areas. Embodiments of the invention do not exceed an amount of copper that comprises more than 30% of the top surface areas of the gutter guard. However, a simple single thread of copper suffices, in some embodiments, for killing moss, mold or mildew on a gutter guard.

Figure 4:
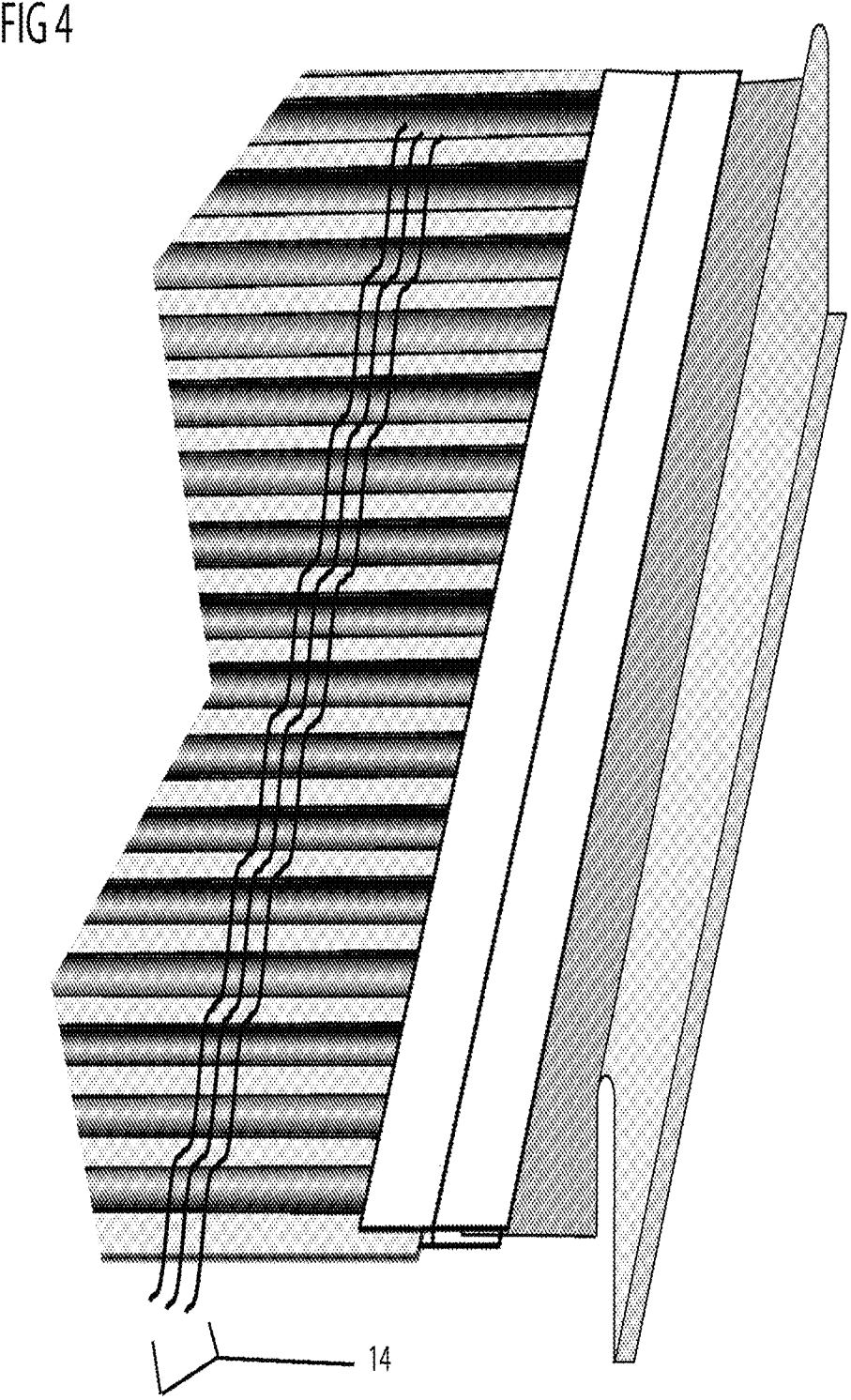
FIG. 4 is a view of the rear section of a corrugated screened gutter guard with copper threads interwoven through the screen.

Referring to FIG. 4, threads 14 are another means of achieving copper-ion dispersal by inter weaving or embroidering copper thread or threads in screen or micro-mesh material. Utilizing an all copper screen can lead to the screen's eventual failure to receive water due to corrosion but, when the copper is limited and made a lesser part of a screening cloth, much of the oxidation and corrosion itself is washed over the remainder of the screen that is not copper and down through its openings, washing away both the corrosion and moss and mold spores that have been killed by the copper, thereby preventing them from "taking root" in the screen or gutter guard body.

Referring again to FIG. 8, there is illustrated a hole or grommet 15 present in the water receiving area 2 of the gutter guard through which a heating or other cable may be drawn or through which elements or agents may be inserted or dispersed down into an underlying gutter. Also illustrated is a cap or cover 16 for the hole or grommet that may remain inserted into the hole or grommet until such time as the opening is needed. The cover or covering method 16 may also be intrinsic to the grommet in a manner similar to garbage disposal rubber stops that are slit and existent in the drain opening: normally remaining closed but able to separate at the slits and allow for debris to be pushed through, then reclosing. In embodiments, the grommet is preferred to a simple hole or other protrusions even if inserted into a solid surface since it prevents rough edges from adversely affecting any cable pulled through.

The scope of this invention is not limited to the positioning of the clips: "open face forward" or to the types of clips illustrated. Embodiments include other clip configurations and securing methods as well as other clip locations. Embodiments include the utilization of clips fastened to the underside of gutter guard devices or drip edges to allow for the installation of heating cables or other elements.

The scope of this invention is not limited to the utilization of copper threads sewn or attached or adhered into filtering cloth or screens or embroidered into, or on top of, filtering cloth or screens or to copper or zinc staples being stapled into a filtering cloth or screen or thin solid body of a gutter guard. Embodiments include the utilization of copper in limited amounts throughout the water receiving area of a gutter guard.

Figure 11:
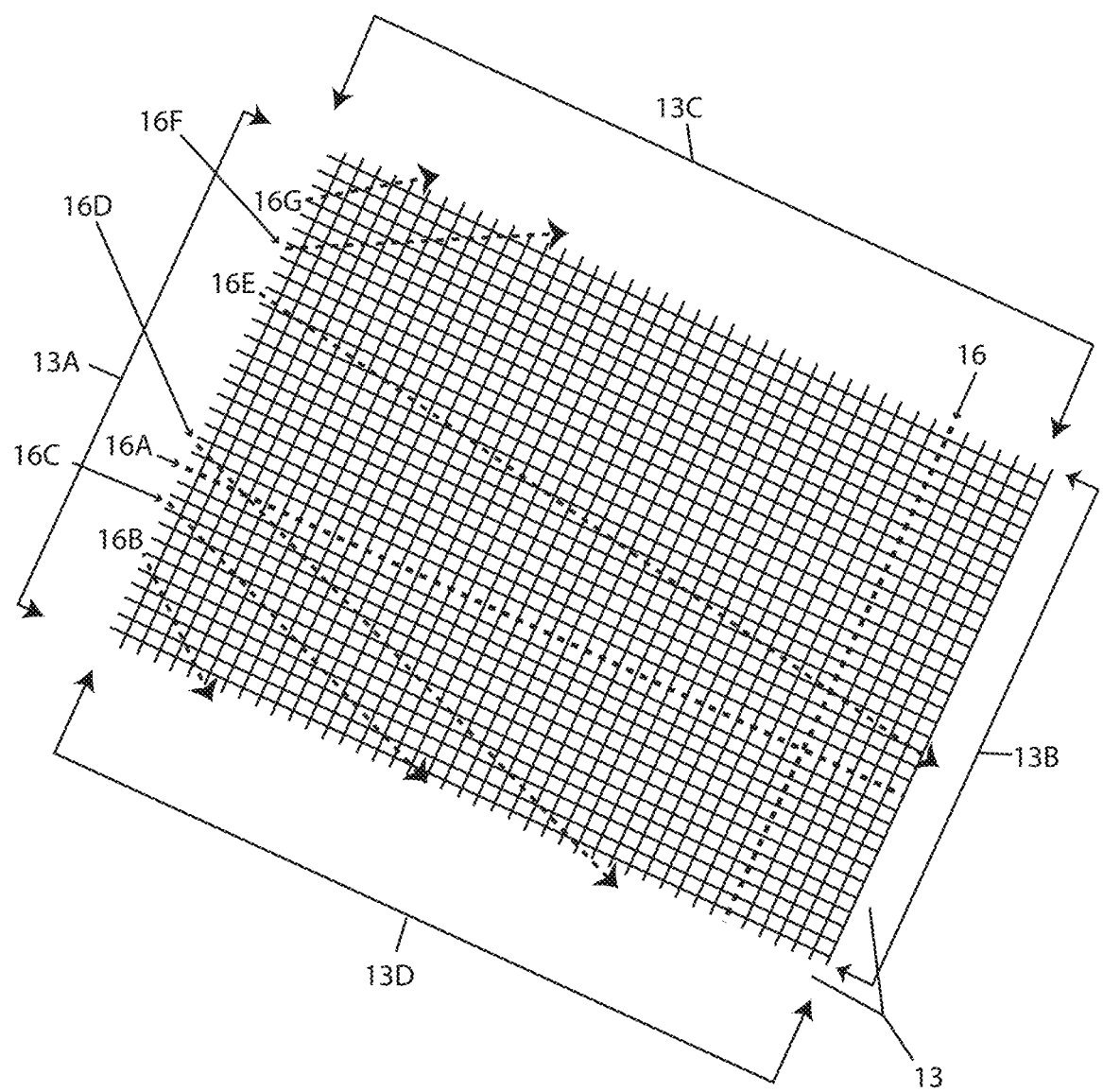
FIG. 11 is a view of a filtering screen having warp and weft wires or threads.

Referring to FIG. 11, there is shown a filtering screen 13 (for example, a first barrier member) having warp 16 (extending, for example, in a first direction) and weft 16A (extending, for example, in a second direction) threads or wires. The warp 16 and weft 16A threads or wires may be comprised of the same or different materials including, but not limited to metal(s), plastic(s), bamboo, cotton, flax, jute, hemp, silk, wool, linen or any other material or substance from which a thread can be made. The filtering screen is also shown having ion-dispersing (for example, copper or zinc) threads or wires or threads 16B, 16C, 16D, 16E, 16F, and 16G (extending, for example, in a third direction) that initiate at or near the filtering screen's left lateral edge 13A (for example, a first edge of a plurality of edges) and that traverse away from the edge in diagonally directioned paths. The diagonally directioned threads or wires: 16B-16G may also initiate at or near the filtering screen's right lateral edge 13B (for example, one of a plurality of edges) or may initiate at or near the filtering screen's rear 13C (for example, one of a plurality of edges and/or a second edge) or front 13D longitudinal edges (for example, one of a plurality of edges) and follow diagonal paths that traverse away from their respective points of initiation. Any number of copper or zinc threads or wires that follow diagonal paths may be sewn or woven into, or made to adhere to, or be sintered onto, or be otherwise attached to the filtering screen 13.

Figure 11A:
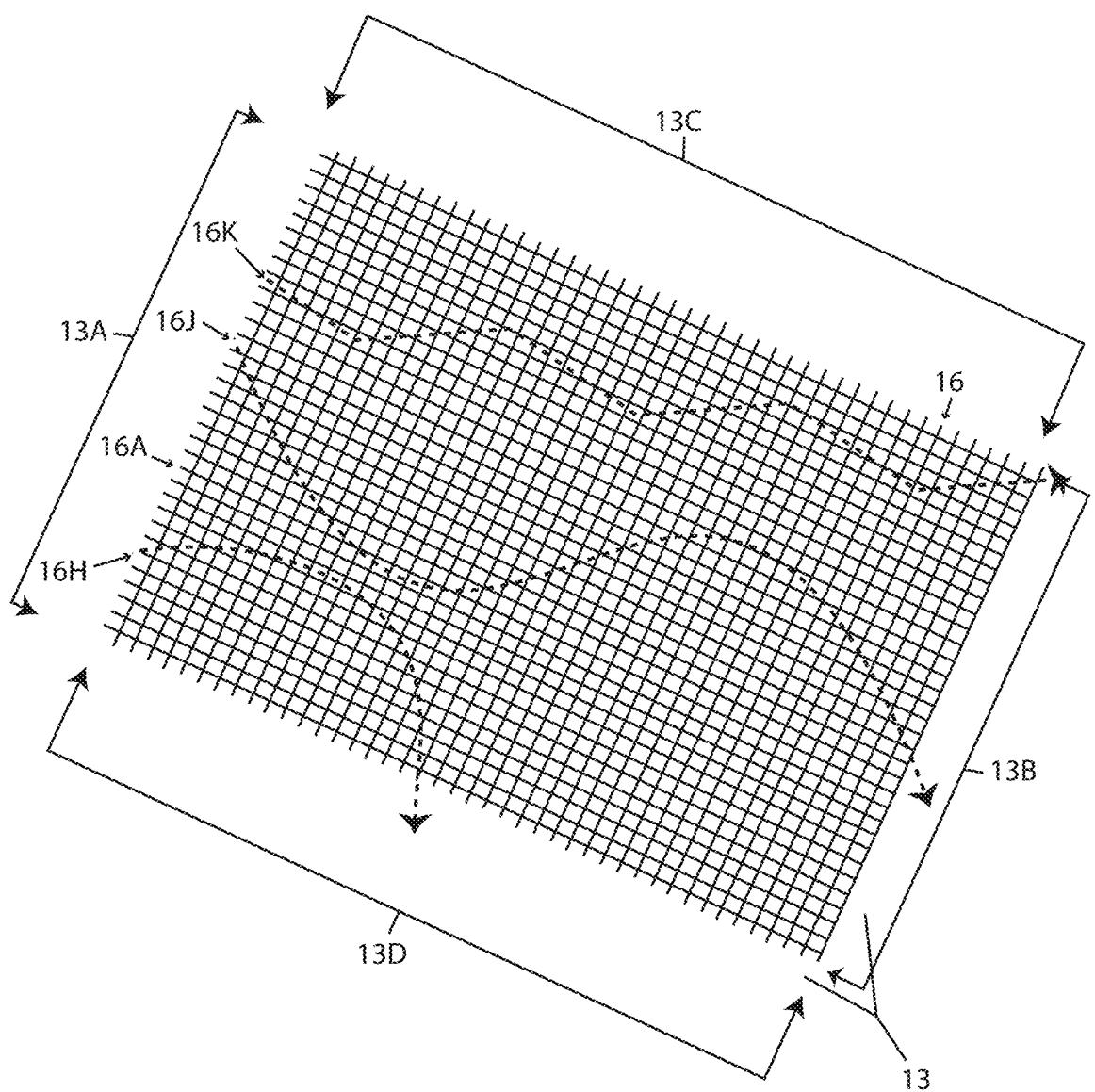
FIG. 11A is a view of a filtering screen having warp and weft wires or threads.

Referring to FIG. 11A, there is shown a filtering screen 13 having warp 16 and weft 16A threads or wires. The warp 16 and weft 16A threads or wires may be comprised of the same or different materials including, but not limited to metal(s), plastic(s), bamboo, cotton, flax, jute, hemp, silk, wool, linen or any other material or substance from which a thread can be made. The filtering screen is also shown having copper or zinc threads or wires 16H, 16J, and 16K that initiate at or near the filtering screen's left lateral edge 13A and that traverse away from the edge in curved 16H, or undulating 16J, or zig-zagged 16K paths. The curved or undulating or zig-zagged pathed threads or wires: 16H-16K may also initiate at or near the filtering screen's right lateral edge 13B or may initiate at or near the filtering screen's rear 13C or front 13D longitudinal edges and traverse away from their respective points of initiation. Any number of copper or zinc threads or wires that follow curved or undulating or zig-zagged paths may be sewn or woven into or made to adhere to or be sintered onto or be otherwise attached to the filtering screen 13.

Figure 11B:
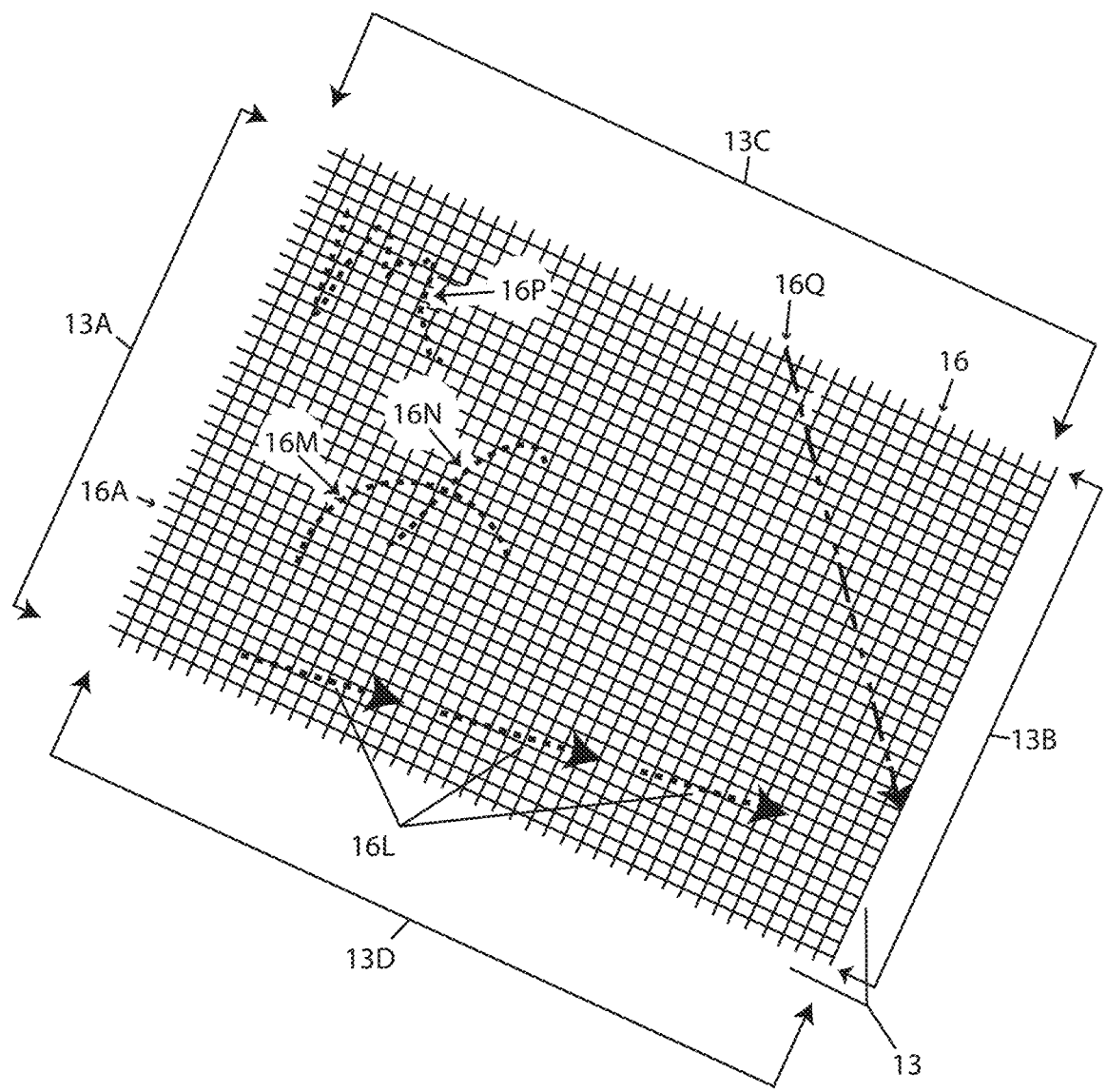
FIG. 11B is a view of a filtering screen having warp and weft wires or threads.

Referring to FIG. 11B, there is shown a filtering screen 13 having warp 16 and weft 16A threads or wires. The warp 16 and weft 16A threads or wires may be comprised of the same or different materials including, but not limited to metal(s), plastic(s), bamboo, cotton, flax, jute, hemp, silk, wool, linen or any other material or substance from which a thread can be made. The filtering screen is also shown having copper or zinc threads or wires or threads 16L, 16M, 16N, and 16P that initiate within the body of the filtering screen 13 rather than at or near the screen's edge.

Reference number 16L references three copper or zinc threads or wires present in a straight segmented path. The segments of each of the three wires may represent small threads or wires in a linear path whose terminal ends is are represented by an arrow heads, or the segments of each wire may represent the top viewable "above the top surface of the screen" portion of a single wire that the single wire has been sewn or woven into. The three threads or wires (or collection of threads or wires) represented by 16L are shown having equal lengths and being equally spaced from one another, however, the threads or wires represented by 16L may be of any number, of any length and of any distance one from another as is shown by the copper wire(s) or thread(s) referenced by 16Q. Copper wire(s) or thread(s) 16Q are shown as individual copper threads or wires, or portions of a single copper wire or thread, sewn through the screen 14, that are visible on the top surface of the screen 14, present in a straight segmented path and having different lengths and being spaced at varying distances, one from another. Although the first copper or zinc wire, or the beginning of a single wire or thread that appears in segmented portions on the top of the screen 13, referenced by 16Q, is shown initiating at or near the filtering screen's right edge 13B, 16Q's first wire or thread, or beginning of a thread that appears in segmented portions of top of the screen 13, they may initiate at or near any edge of the filtering screen 13 or may initiate at any location within the body of the filtering screen.

Reference number 16M references a copper or zinc wire or thread or an assembly of threads or wires following a curved path. Reference numbers 16N and 16P reference copper or zinc threads or wires that follow random paths of irregular shape and are intended to represent that copper or zinc threads or wires present in a filtering screen may follow random paths of any shape or length and that any copper or zinc wire or thread shown in any drawing of this specification may cross over or under any number of other copper or zinc wires having the same or different dimension(s), length(s), shape(s) and/or following or not following the same path(s).

Any number of copper or zinc threads or wires that follow straight or curved or undulating or random or otherwise shaped paths may be sewn or woven into, or made to adhere to, or be sintered onto, or be otherwise attached to the filtering screen 13.

Figure 12:
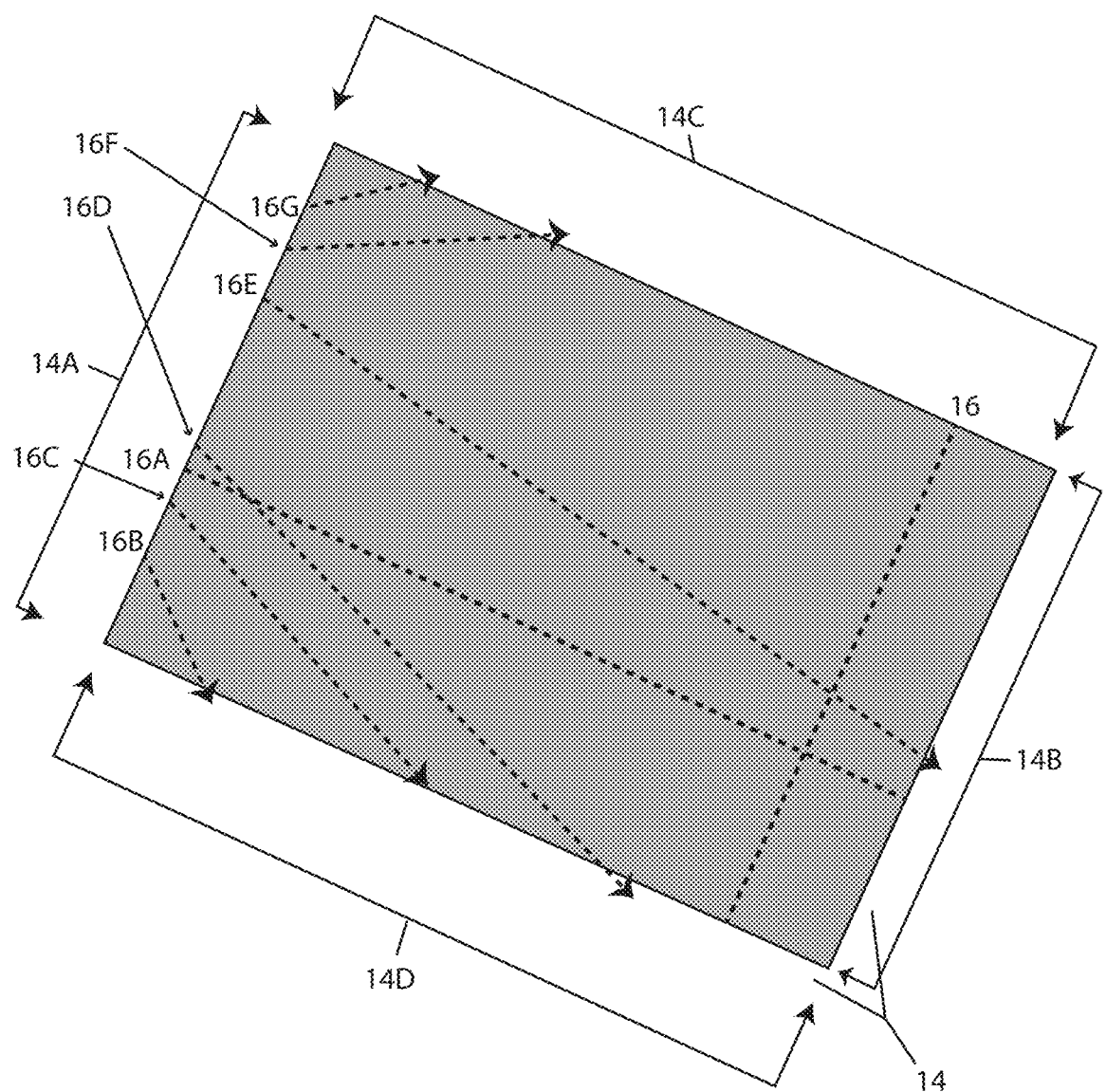
FIG. 12 is a view of a porous membrane or film having copper or zinc wires or threads.

Referring now to FIG. 12, a porous filtering membrane or film 14 is shown. Hereafter, the porous filtering membrane of film 14 will be simply referred to as membrane or film. The membrane or film 14 may be of any thickness. The membrane or film 14 may be comprised of naturally occurring porous materials such as, but not limited to, sponge, natural biopolymers (cellulose, chitosan, collagen) and/or comprised of non-organic porous materials such as, but not limited to, microporous phosphates, oxides, silica or other material molecular sieves, and PTFE membranes.

The membrane or film 14 is shown having copper or zinc threads or wires 16B, 16C, 16D, 16E, 16F, and 16G that initiate at or near the film's left lateral edge 14A and that travel away from the edge in diagonally directed paths. The diagonally directed threads or wires 16B-16G may also initiate at or near the filtering membrane's or film's right lateral edge 14B or may initiate at or near the filtering membrane's or film's rear 14C or front 14D longitudinal edges and follow diagonal paths away from their respective points of initiation. Any number of copper or zinc threads or wires that follow diagonal paths (which may traverse in any direction) may be sewn or woven into, or made to adhere to, or otherwise attached to, the membrane or film 14. The membrane or film 14 is also shown having a copper or zinc wire or thread sewn in a warp 16 direction and a copper or zinc wire or thread sewn in a weft 16A direction.

In instances when the membrane or film 14 is of sufficient thickness, copper or zinc threads or wires may be inserted into and encased by the membrane or film.

Any number of warp or weft directioned or diagonally directioned copper or zinc threads or wires may be sewn or woven into, or made to adhere to, or inserted into, or otherwise attached to the membrane or film 14.

Figure 12A:
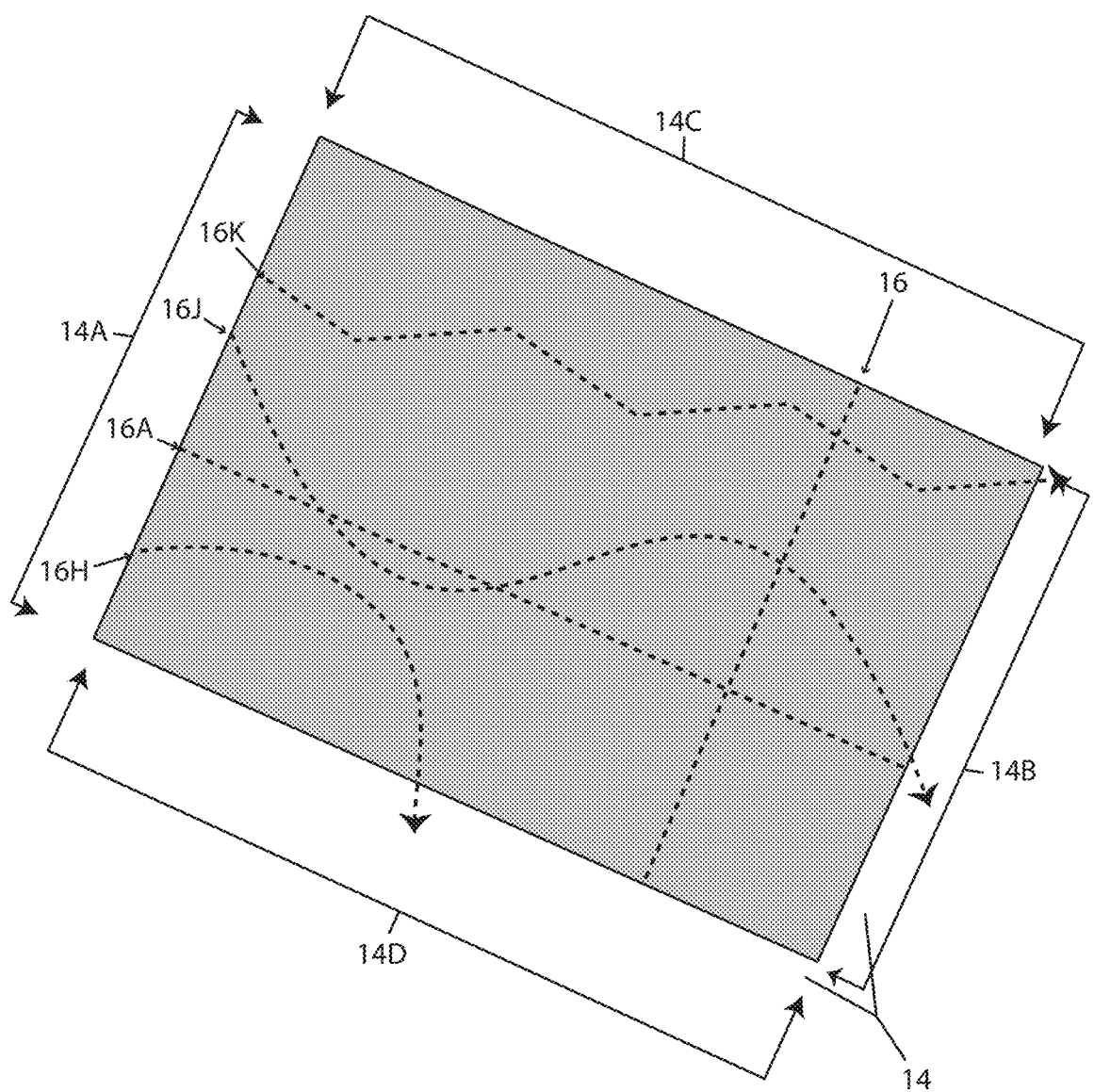
FIG. 12A is a view of a porous membrane or film having copper or zinc wires or threads.

Referring to FIG. 12A, there is shown a membrane or film 14 having copper or zinc warp 16 and weft 16A threads or wires. The membrane or film 14 may be of any thickness. The membrane or film 14 may be comprised of naturally occurring porous materials such as, but not limited to, sponge, natural biopolymers (cellulose, chitosan, collagen) and/or comprised of non-organic porous materials such as, but not limited to, microporous phosphates, oxides, silica or other material molecular sieves, and PTFE membranes.

The membrane or film 14 is also shown having copper or zinc threads or wires 16H, 16J, and 16K that initiate at or near the membrane's or film's left lateral edge 14A and that traverse away from the edge in curved 16H, or undulating 16J, or zig-zagged 16K paths. The curved or undulating or zig-zagged pathed copper or zinc threads or wires 16H-16K may also initiate at or near the membrane's or film's right lateral edge 14B or may initiate at or near the membrane's or screen's 14C or front 14D longitudinal edges and traverse away from their respective points of initiation.

In instances when the membrane or film 14 is of sufficient thickness, copper or zinc threads or wires may be inserted into and encased by the membrane or film.

Any number of copper or zinc threads or wires that follow curved or undulating or zig-zagged paths may be sewn or woven into, or made to adhere to, or be inserted into, or be otherwise attached to the membrane or film 14.

Figure 12B:
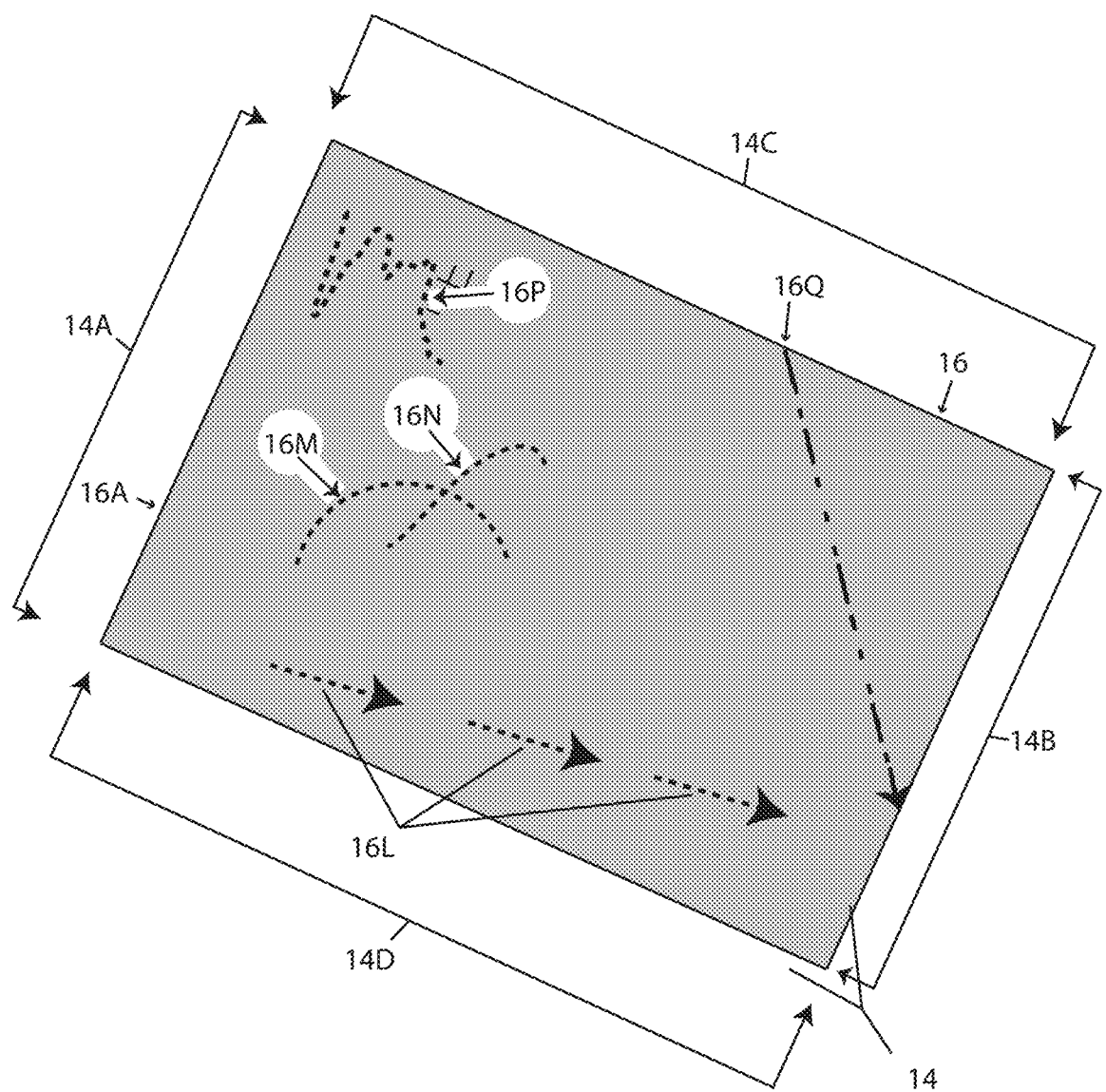
FIG. 12B is a view of a porous membrane or film having copper or zinc wires or threads.

Referring to FIG. 12B, there is shown a membrane or film 14. The membrane of film 14 may be of any thickness. The membrane or film 14 is shown having copper or zinc threads or wires or threads 16L, 16M, 16N, and 16P that initiate within the body of the membrane or film rather than at or near the screen's edge. Reference numbers 16L, 16M, 16N, and 16P represent individual wires or individual assemblies of wires.

Reference number 16L references three copper or zinc threads or wires present in a straight segmented path. The three threads or wires represented by 16L are shown having equal lengths and being equally spaced from one another, however, the threads or wires represented by 16L may be of any number, of any length and of any distance one from another as is shown by the copper threads or wires referenced by 16Q. Reference number 16Q shows individual copper threads or wires, or portions of a single copper wire or thread that are visible on the top surface of the screen, present in a straight segmented path and having different lengths and being spaced at varying distances, one from another. Although the first copper or zinc wire, or the beginning of a single wire or thread that appears in segmented portions on the top of the membrane or film 14, referenced by 16Q is shown initiating at or near the membrane's or film's right edge 14B, 16Q's first wire or thread, or beginning of a thread that appears in segmented portions of top of the membrane or film 14, they may initiate at or near any edge of the membrane or film 14 or may initiate at any location within the body of the membrane or film.

Reference number 16M references a copper or zinc wire or thread or assembly of copper or zinc threads or wires following a curved path.

Reference numbers 16N and 16P reference copper or zinc threads or wires that follow random paths of irregular shape and are intended to represent that copper or zinc threads or wires present in a membrane of film may follow random paths of any shape or length and that any copper or zinc wire or thread shown in any drawing of this disclosure may cross over or under any number of other copper or zinc wires having the same or different dimension(s), length(s), shape(s) and/or following or not following the same path(s).

In instances when the membrane or film 14 is of sufficient thickness, copper or zinc threads or wires may be inserted into and encased by the membrane or film.

Any number of copper or zinc threads or wires that follow curved or straight or random or otherwise shaped paths may be sewn or woven into, or made to adhere to, or be inserted into, or be otherwise attached to the membrane or film 14.

Figure 13:
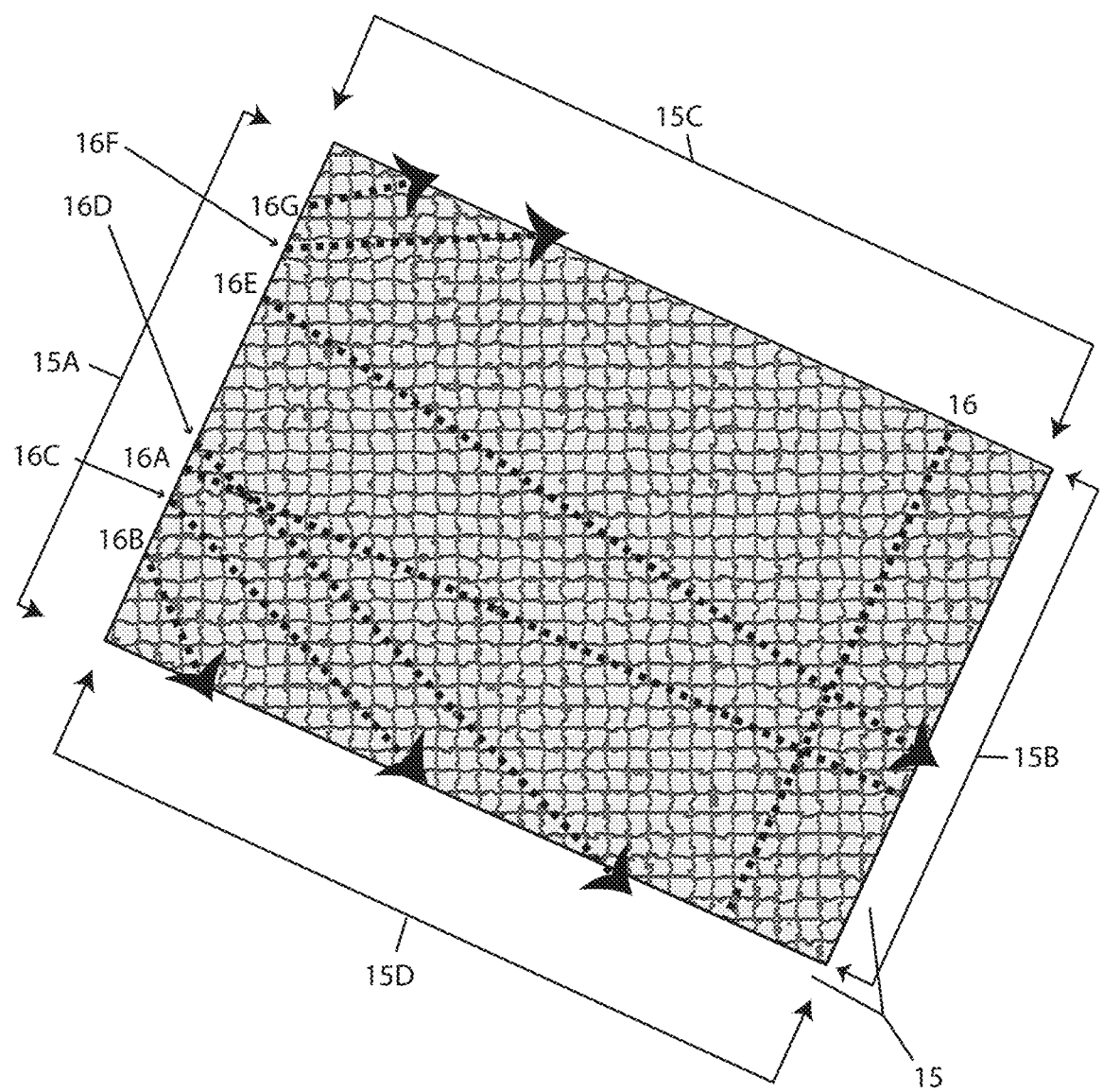
FIG. 13 is a view of a water and/or air permeable mat having copper or zinc threads.

Referring now to FIG. 13, there is shown a water and/or air permeable mat 15 that may be comprised of non-woven extruded lofty fibers or of nano-fibers. The mat 15 also serves to represent a sponge or any organic or non-organic sponge-like material. The mat 15 may be of any thickness or shape. The mat 15 is shown having copper or zinc threads or wires 16B, 16C, 16D, 16E, 16F, and 16G that initiate at or near the mat's left lateral edge 15A and that travel away from the edge in diagonally directed paths. The diagonally directed threads 16B-16G may also initiate at or near the mat's right lateral edge 15B or may initiate at or near the filtering mat's rear 15C or front 15D longitudinal edges and follow diagonal paths away from their respective points of initiation. Any number of copper or zinc threads or wires that follow diagonal paths may be sewn or woven into, or made to adhere to, or otherwise attached to, the mat 15.

The mat 15 is also shown having a copper or zinc wire or thread sewn in a warp 16 direction and a copper or zinc wire or thread sewn in a weft 16A direction. Multiple copper or zinc threads or wires may be sewn in warp or weft directions initiating at or near any edge of the mat 15.

In instances when the mat 15 is of sufficient thickness, copper or zinc threads or wires may be inserted into and encased by the porous membrane or film.

Figure 13A:
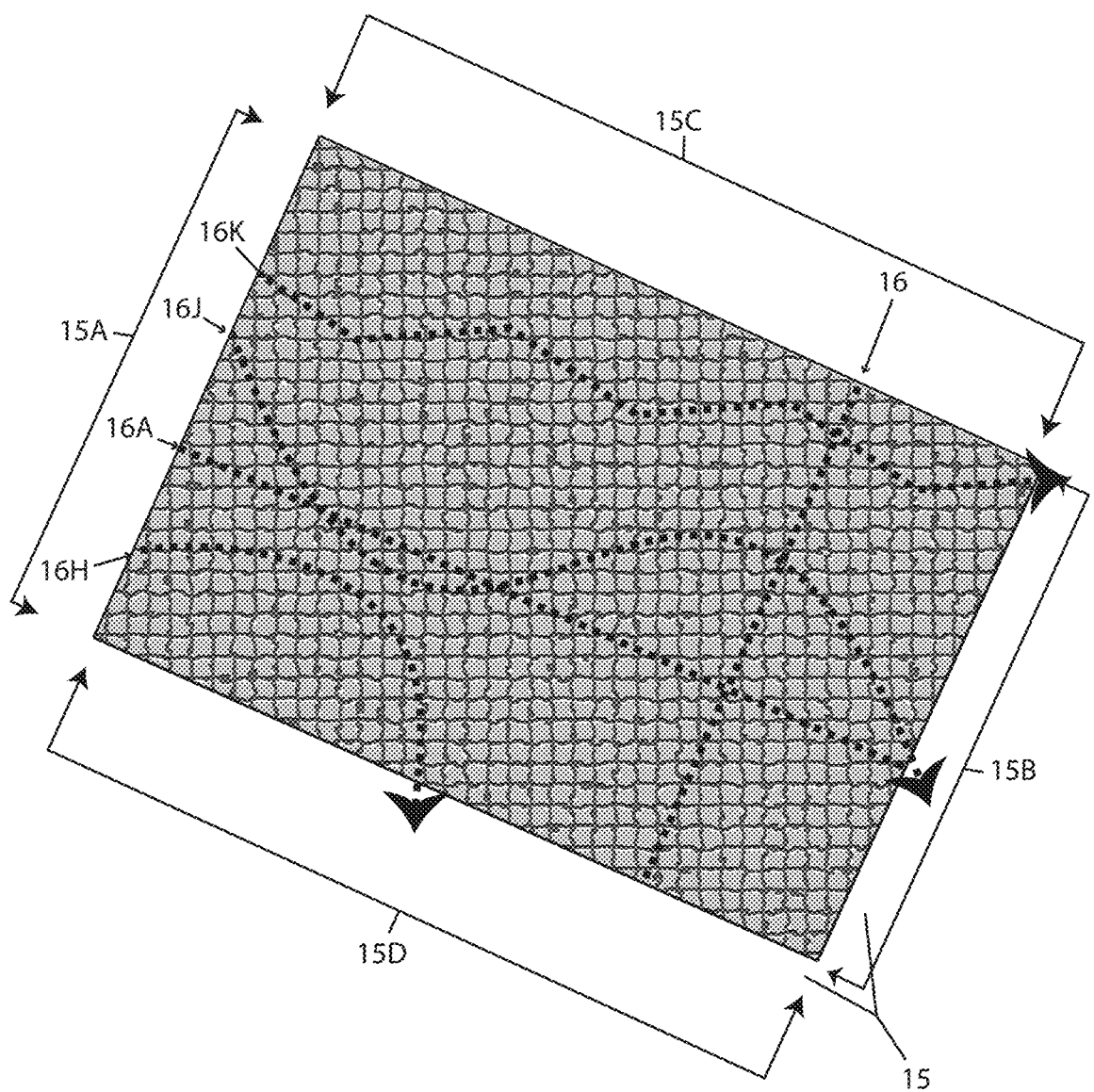
FIG. 13A is a view of a water and/or air permeable mat having copper or zinc warp wires or threads.

Referring to FIG. 13A, there is shown a water and/or air permeable mat 15 that may be comprised of non-woven extruded lofty fibers or of nano-fibers. Mat 15 also serves to represent a sponge or any organic or non-organic sponge-like material. The mat 15 may be of any thickness or shape.

The mat 15 is shown having copper or zinc threads or wires 16H, 16J, and 16K that initiate at or near the mat's left lateral edge 15A and that traverse away from the edge in curved 16H, or undulating 16J, or zig-zagged 16K paths. The curved or undulating or zig-zagged pathed copper or zinc threads or wires 16H-16K may also initiate at or near the mat's right lateral edge 15B or may initiate at or near the mat's rear 15C or front 15D longitudinal edges and traverse away from their respective points of initiation.

In instances when the mat 15 is of sufficient thickness, copper or zinc threads or wires may be inserted into and encased by the membrane or film.

Any number of copper or zinc threads or wires that follow curved, undulating, zig-zagged, or random paths may be sewn or woven into, or made to adhere to, or be inserted into, or be otherwise attached to the mat 15.

Figure 13B:
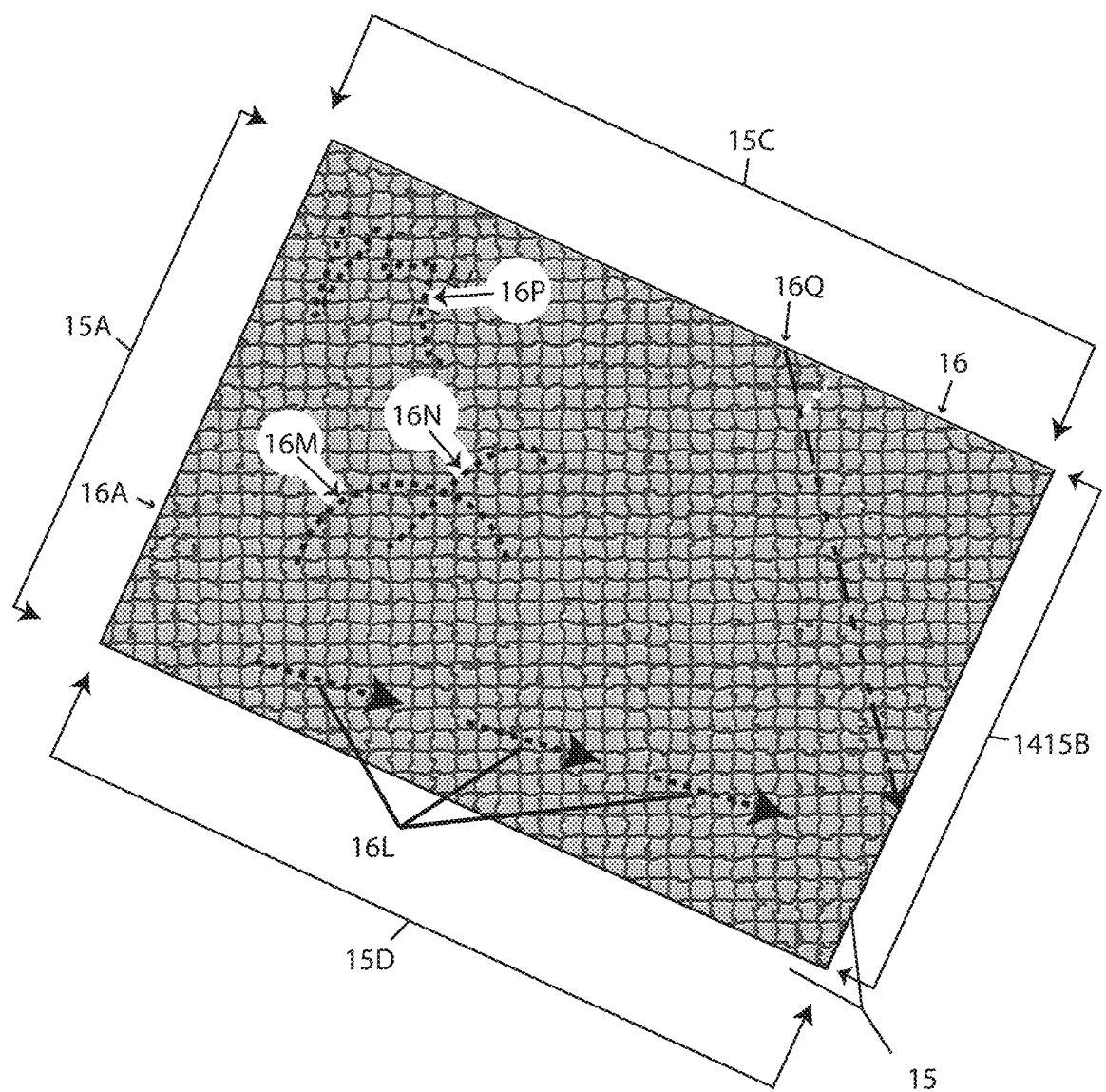
FIG. 13B is a view of a water and/or air permeable mat having copper or zinc warp wires or threads.

Referring to FIG. 13B, there is shown a water and/or air permeable mat 15 which may be comprised of non-woven extruded lofty fibers or of nano-fibers. Mat 15 also serves to represent a sponge or any organic or non-organic sponge-like material. The mat 15 may be of any thickness or shape.

The mat 15 is shown having copper or zinc threads or wires or threads 16L, 16M, 16N, and 16P that initiate within the body of the membrane or film rather than at or near the screen's edge. 16L, 16M, 16N, and 16P represent individual wires.

Reference number 16L references three copper or zinc threads or wires present in a straight segmented path. The three threads or wires represented by 16L are shown having equal lengths and being equally spaced from one another, however, the threads or wires represented by 16L may be of any number, of any length and of any distance one from another as is shown by the copper threads or wires referenced by 16Q. 16Q shows individual copper threads or wires, or portions of a single copper wire or thread that are visible on the top surface of the screen, present in a straight segmented path and having different lengths and being spaced at varying distances, one from another. Although the first copper or zinc wire, or the beginning of a single wire or thread that appears in segmented portions on the top of the mat 15, referenced by 16Q is shown initiating at or near the mat's right edge 15B, 16Q's first wire or thread, or beginning of a thread that appears in segmented portions of top of the mat 15, may initiate at or near any edge of the mat 15 or may initiate at any location within the body of the membrane or film.

Reference number 16M references a copper or zinc wire or thread following a curved path.

Reference number 16N and 16P reference copper or zinc threads or wires that follow random paths of irregular shape and are intended to represent that copper or zinc threads or wires present in a membrane of film may follow random paths of any shape or length and that any copper or zinc wire or thread shown in any drawing of this disclosure may cross over or under any number of other copper or zinc wires having the same or different dimension(s), length(s), shape (s) and/or following or not following the same path(s).

In instances when the mat 15 is of sufficient thickness, copper or zinc threads or wires may be inserted into and encased by the mat.

Figure 14:
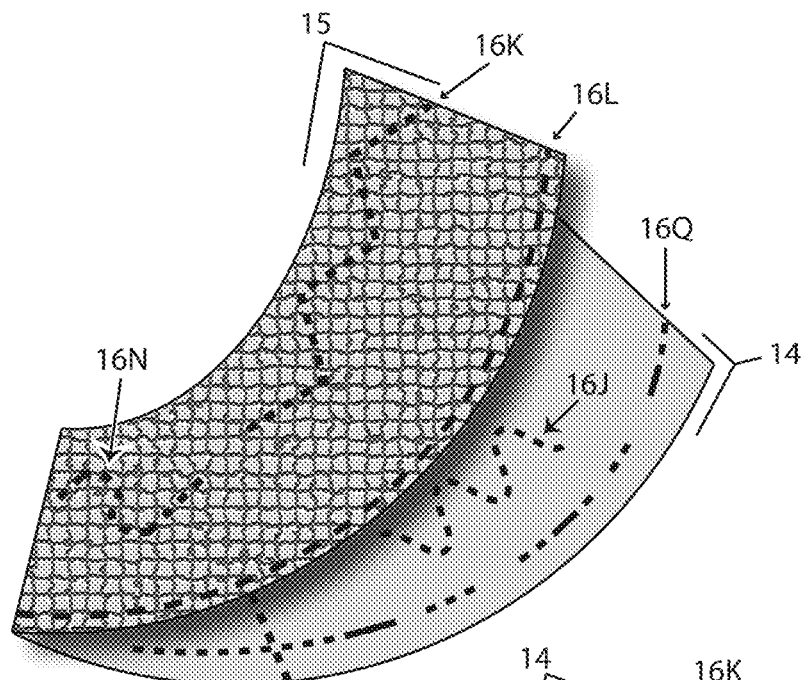
FIG. 14 is a view of a water and/or air permeable mat having copper or zinc threads being present on top of, or beneath, or within the body of the mat overlying a porous membrane or film having copper or zinc wires or threads being present on top of, or beneath, or within the body of the porous membrane or film.

Referring to FIG. 14, there is shown a water and/or air permeable mat 15 (for example, a first barrier member having a plurality of edges such as, for example the plurality of edges, including the first and second edges, discussed in paragraph 0068) that overlies a porous filtering membrane or film 14 (for example, a second barrier member having a plurality of edges such as, for example the plurality of edges, including the first and second edges, discussed in paragraph 0068). The mat 15 is shown having copper or zinc threads or wires: 16L, 16K, and 16N following different paths on top of, beneath, or within the bodies of the mat. The filtering membrane or film 14 is shown having copper or zinc threads or wires 16G, 16J, 16K, 16L, and 16R (extending, for example in a fourth direction) following different paths on top of, beneath, or within the bodies of the filtering membrane of film. FIG. 14 illustrates that different filtering mediums having copper or zinc threads or wires following the same, or different, paths may overly one another in embodiments of the invention.

Figure 15:
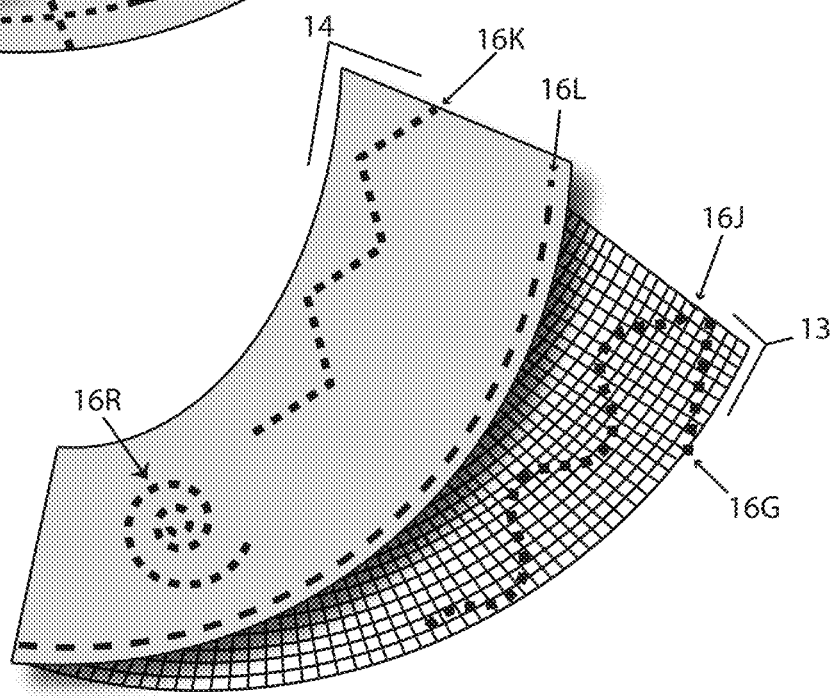
FIG. 15 is a view of a porous membrane or film having copper or zinc wires or threads being present on top of, or beneath, or within the body of the porous membrane or film overlying a filtering screen having copper or zinc wires that are sewn into, onto, or woven into the body of the screen.

Referring to FIG. 15, there is shown a porous filtering membrane or film 14 that overlies a filtering screen 13. The filtering membrane or film 14 is shown having copper or zinc threads or wires 16G, 16J, 16K, 16L, and 16R following different paths on top of, beneath, or within the bodies of the filtering membrane of film. The filtering screen 13 is shown having copper or zinc threads or wires 16G and 16J with 16J following an undulating path and 16G following a diagonal path. FIG. 15 illustrates that different filtering mediums having copper or zinc threads or wires following the same, or different, paths may overly one another in embodiments of the invention.

Both FIG. 14 and FIG. 15 are intended to illustrate that any filtering medium of one type such as, but not limited to, filtering screens, porous membranes or films, water and/or air permeable mats, may overly a filtering medium of the same or of another type in any number and in any combination.

Figure 16:
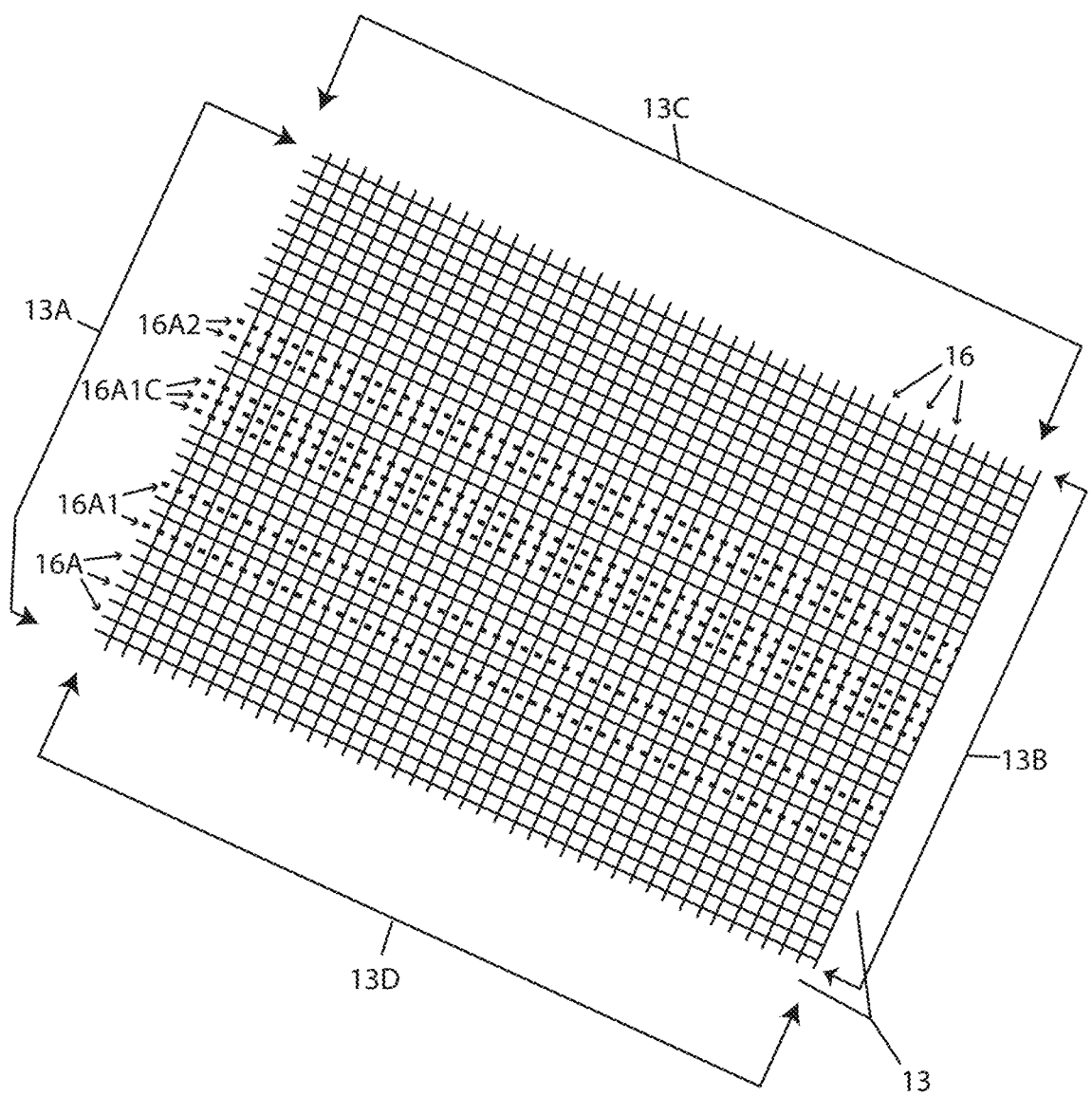
FIG. 16 is a view of a filtering screen having warp and weft wires or threads.

The embodiment shown in FIG. 16 is a multiple material embodiment of the invention directed toward the utilization of different-material warp-directioned and/or weft-directioned threads to achieve different screen properties and capabilities. Referring to FIG. 16, there is shown a filtering screen 13 having warp 16 and weft 16A threads or wires represented by solid lines. In embodiments, warp threads 16 and weft threads 16A are different materials. In embodiments, warp threads 16 are a first material and weft threads 16A, 16A1, 16A1C and 16A2 are a second material that is different from the first material.

In embodiments of the invention, the warp 16 and weft 16A threads or wires are comprised of the same or different materials and/or are of different diameters. Such material may be, but is not limited to, a metal, or plastic, or bamboo, or cotton, or flax, or jute, or hemp, or silk, or wool, or linen or any other material or substance from which a thread or wire can be made. The filtering screen 13 is also shown having weft-directioned threads or wires 16A1 and 16A2 present in the screen that are, in this embodiment, comprised of a material that is different than the material which comprises the warp directioned threads or wires 16 and weft directioned threads or wires 16A. By incorporating different-material weft-directioned threads or wires into the screen 13, a screen property may be achieved which would not be present in a screen having all of its warp and weft threads or wires comprised of the same material. For example, an all-copper screen will have quite a bit of elasticity and little to no metal memory. In circumstances where the all-copper screen is subject to compressive stress, such as a snow load pressing down on an all-copper screen gutter guard filter, the screen will tend to deform and stretch from a flat surface that sheds debris into a screen having sags and pockets that catch and hold debris. A solution, referring again to FIG. 16, for giving the screen 13 a non-deforming property is to choose stainless steel or other rigid material as the material that comprises the warp-directioned threads or wires. In embodiments, when utilized as a gutter guard screen, the stainless-steel or other-rigid-material warp threads 16 would overlie or be inserted into a rain gutter's water receiving channel and traverse from the rear wall of a rain gutter to the rain gutter's front lip providing resistance to a downward deformation of the screen 13 caused by snow-load. In embodiments, copper or copper alloy threads or wires 16A1C can then be incorporated into or onto the screen that will leach copper enabling the screen 13 to kill any moss or mold that might otherwise grow on the screen 13 and clog it.

Referring again to FIG. 16, in embodiments, 16A1C threads or wires refer to threads or wires that are comprised of copper or zinc, or of a copper alloy or zinc alloy, or comprised of a material coated with copper or zinc. In some of these and other embodiments, threads or wires 16, 16A, 16A1, 16A1C, and/or 16A2, may be comprised of any material from which a thread can be made, with these limitations: weft-directioned threads or wires 16A1 and 16A2 are comprised of materials that are different from one another and that are different from whatever material may comprise warp threads or wires 16 and weft threads or wires 16A and that are different from the material that comprises weft threads or wires 16A1C. With this in mind, FIG. 16 illustrates that any number of embodiments of the screen 13, besides the one illustrated, are made possible by using any number of weft-directioned threads that are comprised of materials that may vary in composition from one weft-directioned thread or wire to the next or that may follow random and/or sequential (repetitive) patterns such as, for example, one zinc wire adjacent to a parallel group of three graphite wires that are adjacent and parallel to seven stainless steel wires that are adjacent and parallel to two polymer wires that are adjacent and parallel to four cotton threads.

Still referring to FIG. 16, one embodiment of the invention may represent a gutter guard filtering screen 13 having copper threads or wires 16A1C which serve to inhibit mold growth immediately preceded and followed by dark colored or black graphite threads or wires 16A1G. The dark-colored or black graphite threads or wires 16A1G serve to absorb and then radiate heat which may help prevent light ice formations on the screen or, in instances when a thin layer of ice has covered a screen, aids in melting the ice covering the screen. Black-shingled roofs thaw more readily than roofs with lighter colored shingles.

The embodiment shown in FIG. 16 representatively teaches that as few as one different-material weft-directioned thread or wire or any number of interspersed or successive different-material weft-directioned threads or wires or any random grouping or sequential pattern of different-material threads may be used to form the screen of FIG. 16 with the varied embodiments yielding screens with different properties depending on what material is chosen to comprise threads or wires 16, 16A, 16A1 and 16A2.

Although, in embodiments, the screen 13 of FIG. 16 is shown having a wire or thread count of approximately 12 tpi, they are representative of screens having any number of threads or wires per inch, such threads or wires being of any diameter.

It will be appreciated that variants of the above-disclosed and other features and functions, or alternatives thereof, may be combined into many other different systems or applications. Any of the features described above can be combined with any other feature described above as long as the combined features are not mutually exclusive. Various presently unforeseen or unanticipated alternatives, modifications, variations or improvements therein may be subsequently made by those skilled in the art which are also intended to be encompassed by the invention.

What is claimed is:

1. A filtration device for filtering a fluid, comprising:
a first barrier member having a plurality of openings through which the fluid can penetrate the first barrier member, the first barrier member having a plurality of edges including a first edge; and
a first ion-dispersing thread in the first barrier member,
wherein a portion of the first ion-dispersing thread extends in a direction,
the direction is non-parallel to the first edge of the first barrier member, and
the direction is non-perpendicular to the first edge of the first barrier member.

2. The filtration device of claim 1, wherein the plurality of edges of the first barrier member includes a second edge adjacent to the first edge, and
the ion-dispersing thread extends from the first edge to the second edge.

3. The filtration device of claim 1, wherein the first ion-dispersing thread extends along a non-linear path.

4. The filtration device of claim 1, wherein the first ion-dispersing thread has a first end and a second end,
the first end is located at a position other than one of the plurality of edges of the first barrier member, and
the second end is located at a position other than one of the plurality of edges of the first barrier member.

5. The filtration device of claim 1, wherein the first barrier member is at least one selected from the group consisting of: a filtering screen, a porous membrane, a porous film, a water permeable mat, and an air permeable mat.

6. The filtration device of claim 1, wherein the first barrier member comprises
first members that extend along a first direction; and
second members that extend along a second direction that is non-parallel to the first direction,
wherein the first members are made of a first material,
the second members are made of the first material,
the first material is a non ion-dispersing material,
the direction in which the first ion-dispersing thread extends is a third direction, and
the first direction, the second direction, and the third direction are different directions.

7. The filtration device of claim 6, wherein the second direction is substantially perpendicular to the first direction.

8. The filtration device of claim 1, further comprising a second barrier member having a plurality of openings through which the fluid can penetrate the second barrier member, the second barrier member having a plurality of edges including a first edge,
wherein the first barrier member and the second barrier member are in an overlay relationship relative to each other such that the fluid penetrating one of the plurality of openings in the first barrier member penetrates one of the plurality of openings in the second barrier member.

9. The filtration device of claim 8, further comprising an ion-dispersing thread in the second barrier member,
wherein a portion of the ion-dispersing thread in the second barrier member extends in a fourth direction,
the fourth direction is non-parallel to the first edge of the second barrier member, and
the fourth direction is non-perpendicular to the first edge of the second barrier member.

10. The filtration device of claim 9, wherein the ion-dispersing thread in the second barrier member extends along a second non-linear path.

11. The filtration device of claim 1, wherein the first ion-dispersing thread extends along a zig-zag path.

12. The filtration device of claim 1, wherein the first ion-dispersing thread has a first end, and the first end is located at a position other than one of the plurality of edges of the first barrier member.

13. The filtration device of claim 12, wherein the first ion-dispersing thread has a second end, and the second end is located at one of the plurality of edges of the first barrier member.

14. The filtration device of claim 1, further comprising a second ion-dispersing thread in the first barrier member,
wherein a portion of the second ion-dispersing thread extends in a third direction,
the third direction is non-parallel to the first edge of the first barrier member, and
the third direction is non-perpendicular to the first edge of the first barrier member.

15. The filtration device of claim 14, wherein the third direction and the direction in which the first ion-dispersing material extends are colinear.

16. The filtration device of claim 14, wherein the first ion-dispersing thread in the first barrier member and the second ion-dispersing thread in the first barrier member overlap each other at at least one point.

17. The filtration device of claim 1, wherein the first barrier member is substantially planar.

18. The filtration device of claim 1, wherein the plurality of edges of the first barrier member includes a second edge adjacent to the first edge.

19. The filtration device of claim 18, wherein the second edge intersects the first edge.

20. The filtration device of claim 1, wherein the first barrier member has a plurality of first threads that extend in a first thread direction,
the first barrier member has a plurality of second threads that extend in a second thread direction, the second thread direction being non-parallel to the first thread direction, and the direction in which the portion of the first ion-dispersing thread extends is non-parallel to the first thread direction and is non-parallel to the second thread direction.

21. A filtration device for filtering a fluid, comprising:
a first barrier member having a plurality of openings through which the fluid can penetrate the first barrier member, the first barrier member having a plurality of edges including a first edge;
a second barrier member having a plurality of openings through which the fluid can penetrate the second barrier member, the second barrier member having a plurality of edges including a first edge; and
an ion-dispersing thread in the first barrier member,
wherein the first barrier member and the second barrier member are in an overlay relationship relative to each other such that the fluid penetrating one of the plurality of openings in the first barrier member penetrates one of the plurality of openings in the second barrier member,
the first barrier member is at least one selected from the group consisting of: a filtering screen, a porous membrane, a porous film, a fluid permeable mat, and an air permeable mat,
the second barrier member is at least one selected from the group consisting of: a filtering screen, a porous membrane, a porous film, a fluid permeable mat, and an air permeable mat,
a portion of the ion-dispersing thread extends in a direction,
the direction is non-parallel to the first edge of the first barrier member, and
the direction is non-perpendicular to the first edge of the first barrier member.

22. The filtration device of claim 21, wherein the first barrier member and the second barrier member are different ones of the group consisting of: a filtering screen, a porous membrane, a porous film, a liquid permeable mat, and an air permeable mat.

23. The filtration device of claim 21, further comprising an ion-dispersing thread in the second barrier member,
wherein a portion of the ion-dispersing thread in the second barrier member extends in a second direction,
the second direction is non-parallel to the first edge of the second barrier member, and
the second direction is non-perpendicular to the first edge of the second barrier member.

24. A filtration device for filtering a fluid, comprising:
a barrier member having a plurality of openings through which the fluid can penetrate the barrier member, the barrier member having
first members that extend along a first direction, and
second members that extend along a second direction that is non-parallel to the first direction; and
an ion-dispersing thread in the barrier member, the ion-dispersing thread being both above an upper surface of the barrier member, and below a lower surface of the barrier member,
wherein the first members are made of a first material,
the ion-dispersing thread is made of a second material,
the first material and the second material are different materials,
the barrier member is a single-layer mesh,
the single-layer mesh comprises the first members and the second members wherein a portion of the ion-dispersing thread extends in a third direction,
the third direction is non-parallel to the first direction and the second direction, and
the third direction is non-perpendicular to the first direction and the second direction.

* * * * *